US008204278B2

(12) United States Patent
Edanami

(10) Patent No.: US 8,204,278 B2
(45) Date of Patent: Jun. 19, 2012

(54) IMAGE RECOGNITION METHOD

(75) Inventor: Ikumi Edanami, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 908 days.

(21) Appl. No.: 12/232,683

(22) Filed: Sep. 22, 2008

(65) Prior Publication Data

US 2009/0028389 A1 Jan. 29, 2009

Related U.S. Application Data

(63) Continuation of application No. PCT/JP2006/323685, filed on Nov. 28, 2006.

(51) Int. Cl.
*G06K 9/00* (2006.01)

(52) U.S. Cl. ........................................ 382/104; 382/190

(58) Field of Classification Search .................. 382/104, 382/181, 190, 203

See application file for complete search history.

(56) References Cited

U.S. PATENT DOCUMENTS

| 2003/0156737 | A1 | 8/2003 | Ohtsuka et al. | 382/104 |
| 2006/0233423 | A1* | 10/2006 | Najafi et al. | 382/103 |

FOREIGN PATENT DOCUMENTS

| JP | 6-201379 A | 7/1994 |
| JP | 09-330404 A | 12/1997 |
| JP | 11-345336 A | 12/1999 |
| JP | 2000-39306 A | 2/2000 |
| JP | 2000-148977 A | 5/2000 |
| JP | 2001-351200 A | 12/2001 |
| JP | 2005-149250 A | 6/2005 |
| JP | 2005-190142 A | 7/2005 |
| JP | 2005-209155 A | 8/2005 |

* cited by examiner

*Primary Examiner* — Andrew W Johns
(74) *Attorney, Agent, or Firm* — Staas & Halsey LLP

(57) ABSTRACT

According to an aspect of an embodiment, a method for detecting a subject in an image, comprising the steps of: dividing said image into a plurality of regions; calculating a similarity between a feature of one of said regions and the feature of another of said regions; determining a distribution of said similarities corresponding to said regions; and detecting the subject in the image by determining correlation of said distribution with a shape of said subject.

12 Claims, 15 Drawing Sheets

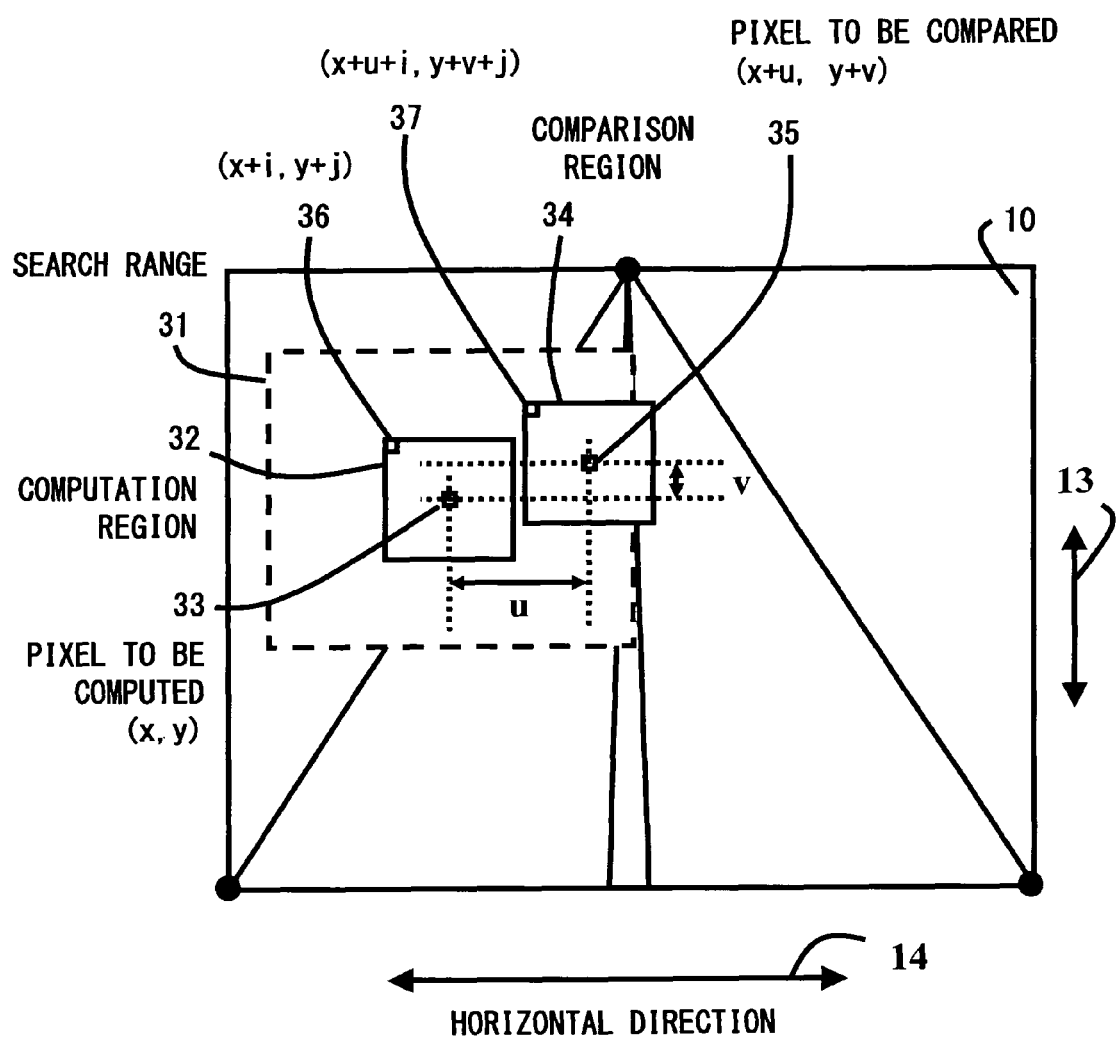

IMAGE RECOGNITION METHOD

CROSS-REFERENCE TO RELATED APPLICATIONS

This application is a continuation of prior International Application No. PCT/JP2006/323685, filed Nov. 28, 2006, the entire contents of which are incorporated herein by reference.

BACKGROUND OF THE INVENTION

1. Field of the Invention

The invention relates to image recognition methods, image processing apparatuses, and image recognition programs, and, more particularly, to an image recognition method, an image processing apparatus, and an image recognition program capable of detecting a subject in an image.

2. Description of the Related Art

There is a technique for detecting a vehicle or a pedestrian from an image obtained by a fixed camera or a camera installed in a mobile unit in a traffic system. For example, such a technique for detecting a vehicle or a pedestrian is used in a case in which data of an image obtained at a traffic intersection is used to detect whether a vehicle or a pedestrian exists at the traffic intersection and information about the detected vehicle or pedestrian is transmitted to a traveling vehicle. The driver of the traveling vehicle can check in advance the state of the traffic intersection.

Methods of extracting a vehicle to be detected from an image include a background subtraction method and an edge detection method. The background subtraction method is a method of extracting an object from an image by comparing a background image including no object, which has been obtained in advance, with the image including the object. The edge detection method is a method of specifying an object (a vehicle) by comparing model edge data, which has been stored in advance, with detected edge data. A technique related to the above techniques is disclosed in Japanese Laid-open Patent Publication No. 2005-190142 and Japanese Laid-open Patent Publication No. 2000-148977.

In the case of the background subtraction method, the position of a vehicle in an image cannot be accurately detected, since a region including not only the vehicle but also the shadow of the vehicle is detected. In the case of the edge detection method, the shadow of an object is also detected. Furthermore, it takes much time to detect an object, since the object is specified by comparing shape data obtained by edge detection with pieces of shape data stored in advance in a database.

SUMMARY OF THE INVENTION

According to an aspect of an embodiment, a method for detecting a subject in an image, comprising the steps of: dividing said image into a plurality of regions; calculating a similarity between a feature of one of said regions and the feature of another of said regions; determining a distribution of said similarities corresponding to said regions; and detecting the subject in the image by determining correlation of said distribution with a shape of said subject.

BRIEF DESCRIPTION OF THE DRAWINGS

FIG. 4 is a conceptual diagram describing the acquisition of a similarity value from an obtained image;

DETAILED DESCRIPTION OF THE PREFERRED EMBODIMENTS

In this embodiment, an operation for detecting a vehicle from an image obtained by a camera fixed at a traffic intersection will be described.

Figure 1:
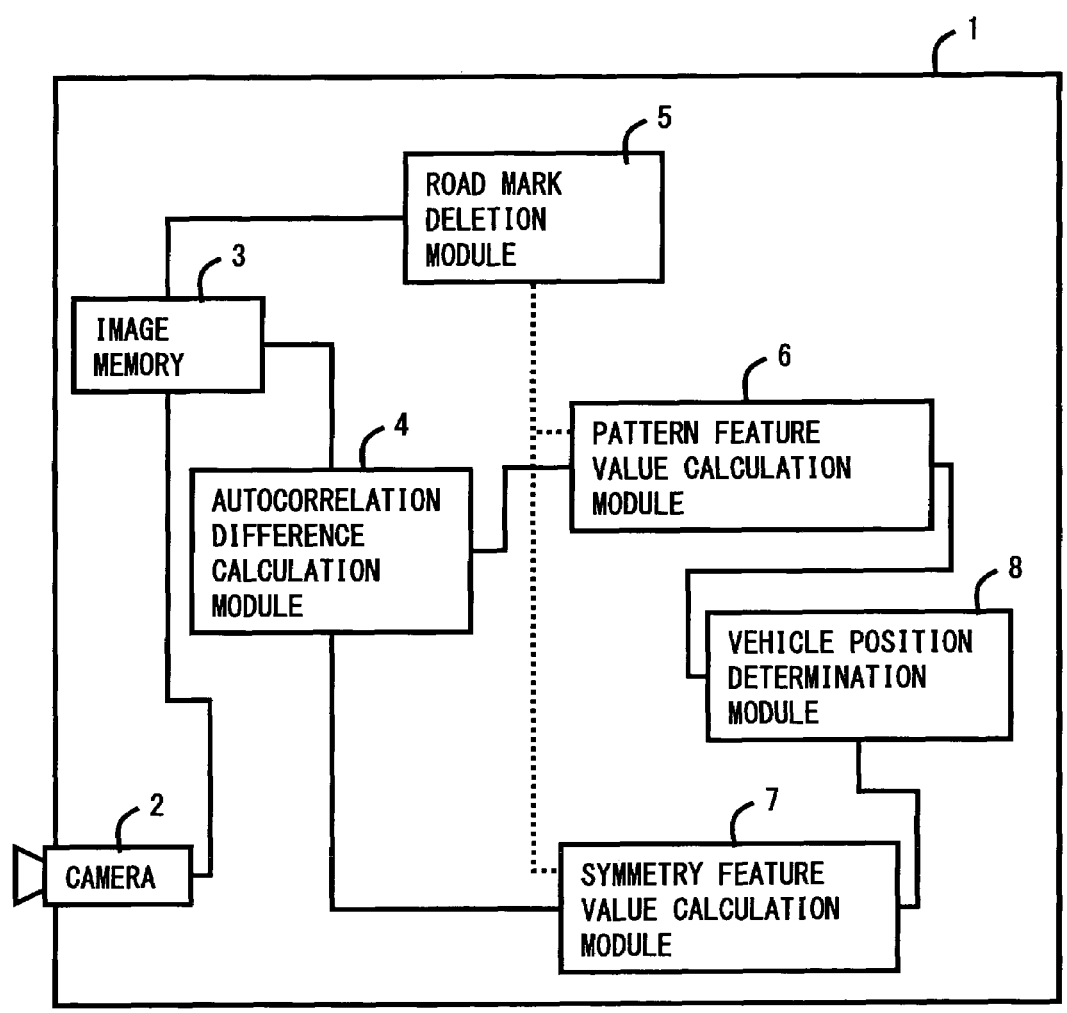
FIG. 1 is a diagram illustrating a configuration of an image processing apparatus according to an embodiment of the invention.

FIG. 1 is a diagram illustrating a configuration of an image processing apparatus 1 according to an embodiment of the invention. The image processing apparatus 1 includes a camera 2, an image memory 3, an autocorrelation difference calculation module 4, a road mark deletion module 5, a pattern feature value calculation module 6, a symmetry feature value calculation module 7, and a vehicle position determination module 8.

Data of an image captured by the camera 2 at a traffic intersection is stored in the image memory 3. The autocorrelation difference calculation module 4 obtains the difference among similarity values for each pixel and creates a diagram of the distribution of differences among similarity values from the image data stored in the image memory 3. The road mark deletion module 5 deletes a road mark region included in the image whose data is stored in the image memory 3. Thus, the image processing apparatus 1 obtains the distribution diagram including no road mark by calculating the difference among the similarity values from the original image data and deleting the road mark from the image corresponding to the image data. Subsequently, the pattern feature value calculation module 6 detects the pattern of a vehicle from the diagram of the distribution of the differences among similarity values. The pattern feature value calculation module 6 obtains a coordinate in a vertical direction which denotes the front or rear end of the vehicle in the image. The pattern feature value calculation module 6 takes information about the region deleted by the road mark deletion module 5 into consideration when detecting the pattern of the vehicle. The symmetry feature value calculation module 7 computes the symmetry of the vehicle using the diagram of the distribution of the differences among similarity values which has been created by the autocorrelation difference calculation module 4. The symmetry feature value calculation module 7 obtains the centerline of the vehicle in the image on the basis of the symmetry of the vehicle. The vehicle position determination module 8 specifies the position of the vehicle in the horizontal direction in the image on the basis of pieces of information transmitted from the pattern feature value calculation module 6 and the symmetry feature value calculation module 7. Furthermore, the vehicle position determination module 8 obtains information about the width of the vehicle on the basis of the position of the vehicle, and specifies the type of the vehicle by searching a database for a record matching the width of the vehicle and the position of the vehicle in the vertical direction in the image.

Figure 2:
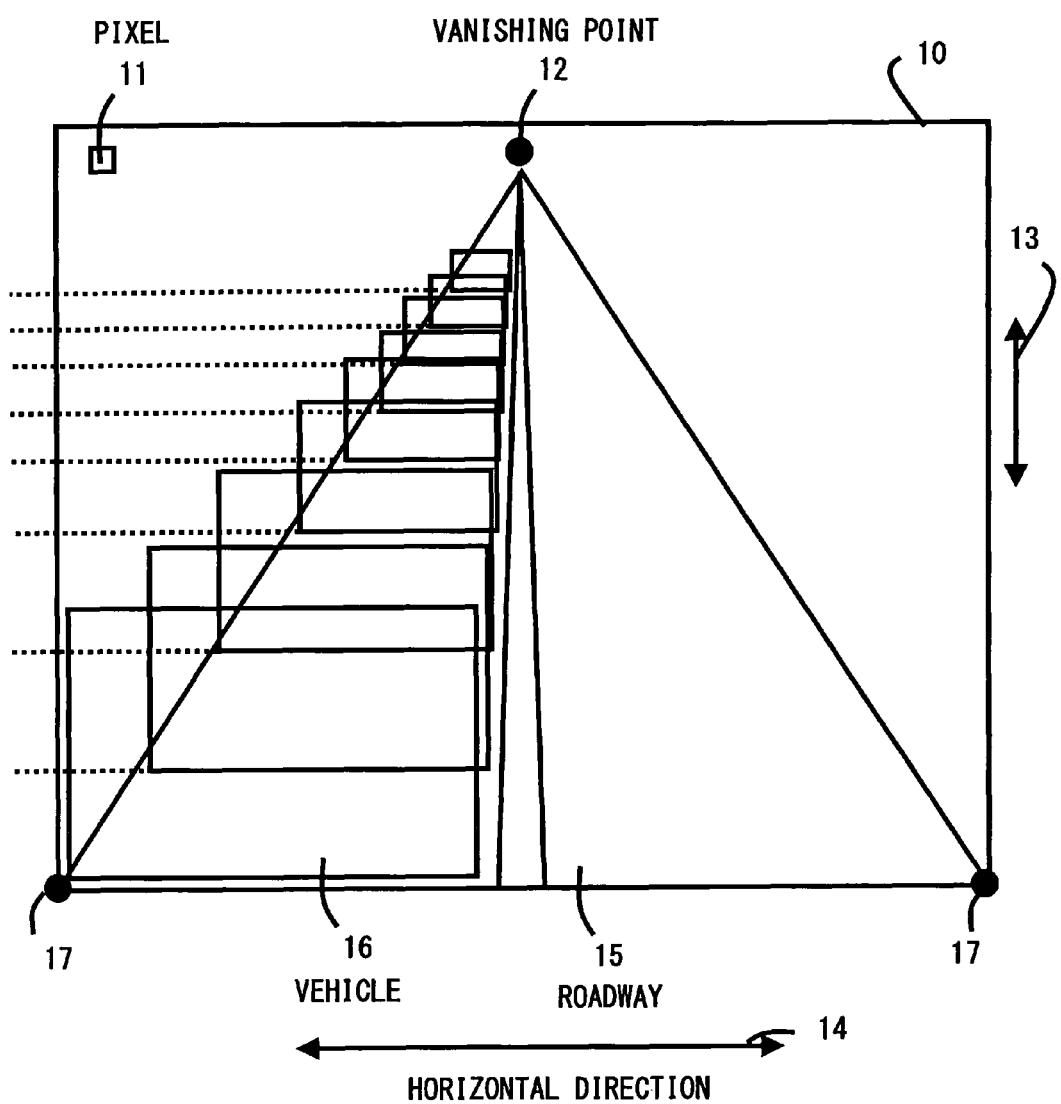
FIG. 2 is an image captured by a camera according to an embodiment of the invention.

Next, the image obtained by the camera 2 included in the image processing apparatus 1 will be described. FIG. 2 illustrates an image 10 captured by the camera 2 according to an embodiment of the invention. The image 10 is composed of pixels 11 each of which is the smallest unit forming the image 10, and is stored in the image memory 3 in digital form. In the following description, the vertical and horizontal directions of the image 10 denote a vertical direction 13 and a horizontal direction 14, respectively. A vertical coordinate (ordinate) denotes a coordinate specifying a position in the vertical direction 13 in the image 10, and a horizontal coordinate (abscissa) denotes a coordinate specifying a position in the horizontal direction 14 in the image 10. A vanishing point 12 corresponds to the deepest coordinates in three-dimensional space when the two-dimensionally projected image 10 is observed as an original three-dimensional image.

If the camera 2 is disposed at a position overlooking a roadway 15, the vanishing point 12 is generally placed at an upper position in the vertical direction 13 in the image 10. This can increase an image capturing area of the roadway 15 in the image 10. Accordingly, the image processing apparatus 1 can divide the vertical direction 13 of the roadway 15 into a larger number of vertical coordinates as compared with a case in which the vanishing point 12 is placed on the lower side of the image 10. In the case that the vertical direction 13 can be divided into a larger number of vertical coordinates, the image processing apparatus 1 can obtain an accurate measurement of the position of a vehicle (subject) 16 on the roadway 15. On the other hand, if the camera 2 is installed in the vehicle 16, the camera 2 is generally disposed at a lower front portion of the vehicle 16 so that it is horizontal to the ground. Accordingly, if the camera 2 points downward, it cannot capture the image of the top portion of the vehicle 16 running ahead of the vehicle 16 in which the camera 2 is installed.

The camera 2 is disposed so that the maximum width of the roadway 15 can be obtained at a lower position in the vertical direction 13 in the image 10. At that time, points 17 each of which is a boundary point between the roadway 15 and a side strip in the foreground of the image 10 are placed in the lowermost part of the image 10. Consequently, the camera 2 can obtain a close-up image of the vehicle 16 in the foreground of the image 10. As a result, the image processing apparatus 1 can increase the number of pixels corresponding to the width of the vehicle 16, thereby obtaining accurate information about the width of the vehicle 16. The viewing angle of the camera 2, which is required for the setting of the width of the roadway 15, and the coordinates of the vanishing point 12 may be changed in accordance with a target object and a traffic condition.

Next, data used by the image processing apparatus 1 to detect the vehicle 16 will be described. The image processing apparatus 1 has coordinate information of the vanishing point 12 included in the image 10 and pieces of coordinate information of the points 17 each of which is a boundary point between the roadway 15 and a side strip in the foreground of the image 10. The points 17 are placed on either side of the roadway 15. Furthermore, the image processing apparatus 1 obtains pieces of information about straight lines between the vanishing point 12 and the points 17 which function as boundary lines between the roadway 15 and side strips. The image processing apparatus 1 includes a database 20 in which the coordinate of the vehicle 16 in the vertical direction 13 in the image 10 is associated with the width of each type of the vehicle 16.

Figure 3:
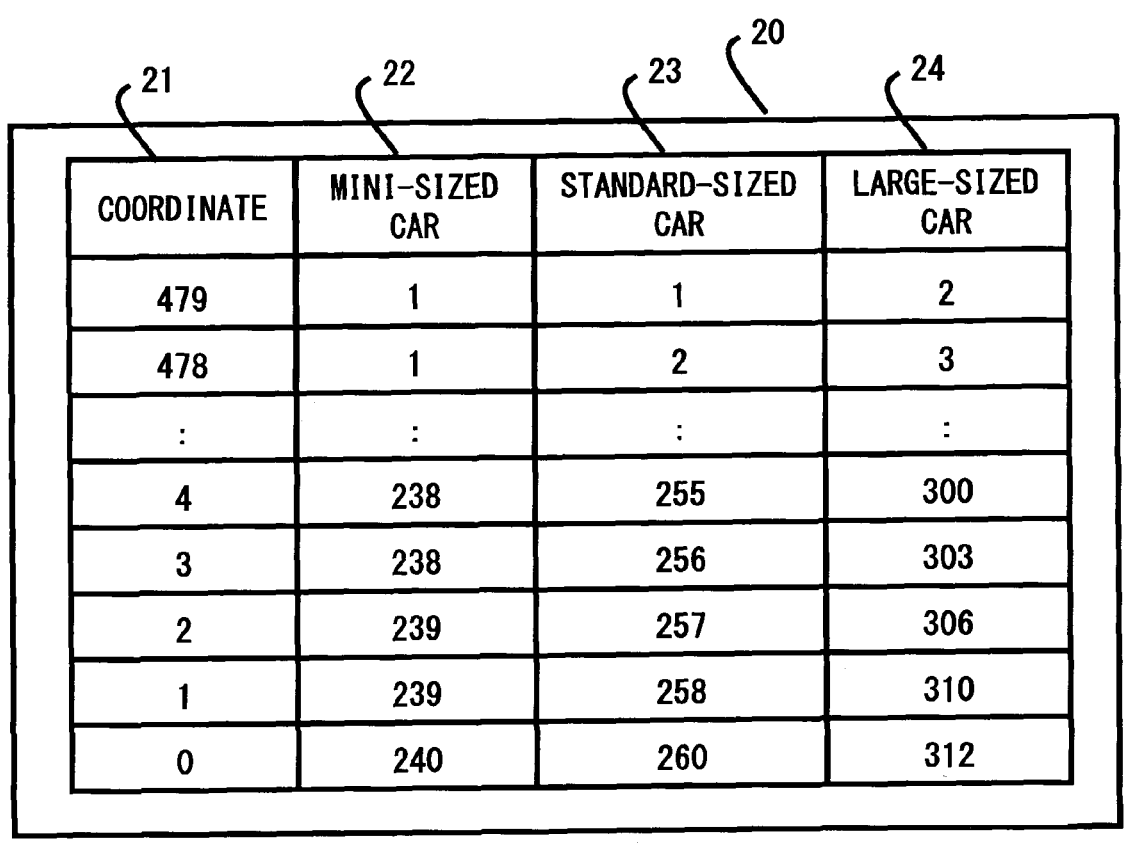
FIG. 3 is a diagram illustrating an exemplary configuration of a database in which the vertical coordinate of a vehicle in an image is associated with the width of each type of vehicle.

FIG. 3 is a diagram illustrating an exemplary configuration of the database 20 in which the coordinate 21 of the vehicle 16 in the vertical direction 13 in the image 10 is associated with the width of each type of the vehicle 16. For example, there are 480 pixels (the pixels 11) in the vertical direction 13 in the image 10. The database 20 includes the coordinate 21 of each of the pixels 11 in the vertical direction 13 and the pieces of width information of various types of the vehicles 16 which are associated with the coordinate 21. The types of the vehicles 16 are a mini-sized car 22, a standard-sized car 23, and a large-sized car 24, and the width of the vehicle 16 is determined in accordance with the type of the vehicle 16. For example, the general width of the standard-sized car 23 is 1700 mm. The image processing apparatus 1 can obtain in advance the number of pixels in the horizontal direction 14 corresponding to the width of the vehicle 16 associated with the coordinate 21 of the vehicle 16 in the vertical direction 13 in the image 10. In the database 20, the number of pixels in the horizontal direction 14, which corresponds to the width of the vehicle 16 such as the mini-sized car 22, the standard-sized car 23, or the large-sized car 24, is associated with the coordinate 21 of the vehicle 16 in the vertical direction 13 and is then stored as width information of the vehicle 16.

Referring back to FIG. 2, the length of a base of a rectangle representing the vehicle 16 on the roadway 15 in the image 10 corresponds to the number of pixels in the horizontal direction 14, that is, the width of the vehicle 16. The number of pixels in the horizontal direction 14 corresponding to the width of the vehicle 16 is changed in accordance with a coordinate in the vertical direction 13 at which the rectangle is detected.

Next, the creation of a diagram of the distribution of differences among similarity values which is performed by the autocorrelation difference calculation module 4 included in the image processing apparatus 1 will be described. The autocorrelation difference calculation module 4 calculates a difference 39 among similarity values 38 for each of the pixels 11 included in the image 10. The similarity value 38 numerically expresses the degree of similarity between a first region and a second region which are set in the image 10.

FIG. 4 is a conceptual diagram describing the acquisition of the similarity value 38 from the image 10 which is performed by the autocorrelation difference calculation module 4.

A pixel to be computed 33 (first pixel) is a current target pixel (the pixel 11) for which the similarity value 38 is computed. All the pixels 11 included in the image 10 are individually set as the pixel to be computed 33. The computation of the similarity value 38 may not be performed for the pixel 11 placed in a region in the image 10 in which the vehicle 16 cannot exist. For example, the autocorrelation difference calculation module 4 may not compute the similarity value 38 for the pixel 11 placed in a region outside a side strip where it can be assumed that the vehicle 16 does not exist. Such a region including pixels for which computation may not be performed is set in advance, and the autocorrelation difference calculation module 4 calculates the similarity values 38 for all the pixels 11 placed in a region except for the above-described region. Thus, since the autocorrelation difference calculation module 4 does not perform computation for a pixel in the region in which it can be assumed that the vehicle 16 does not exist, the amount of computation performed by the image processing apparatus 1 is reduced. Consequently, the image processing apparatus 1 can shorten the time required to obtain a computation result.

A pixel to be compared 35 (second pixel) is a current target pixel (the pixel 11) in the image 10 for which the similarity value 38 to the pixel to be computed 33 is computed.

A computation region 32 (first region) includes the pixel to be computed 33 as a center pixel and functions as a current target region to be compared when the computation of the similarity value 38 is performed. A comparison region 34 (second region) includes the pixel to be compared 35 as a center pixel and functions as a target region to be compared with the computation region 32.

A search range 31 is a range in which the pixel to be compared 35 is set for the pixel to be computed 33. The reason why the search range 31 is set is because it is not required to calculate the similarity value 38 when there is a long distance between the coordinates of the pixel to be computed 33 and the coordinates of the pixel to be compared 35 in the image 10. When there is a long distance between the coordinates of the pixel to be computed 33 and the coordinates of the pixel to be compared 35, it cannot be considered that the computation region 32 and the comparison region 34 are set for the detection of a single vehicle (the vehicle 16). If the similarity value 38 between significantly different objects is computed, the vehicle 16 may be falsely detected in the image 10. Accordingly, for example, the search range 31 is set to a range in which the pixel to be computed 33 is included as a center pixel and the vehicle 16 can exist.

All the pixels 11 in the search range 31 are individually set as the pixel to be compared 35. If the search range 31 and a region in which the vehicle 16 cannot exist overlap, the autocorrelation difference calculation module 4 may not compute the similarity value 38 of the pixel to be compared 35 included in the overlapping portion may. This reduces the amount of computation performed by the image processing apparatus 1. Consequently, the image processing apparatus 1 can shorten the time required to obtain a computation result.

Figure 5A:
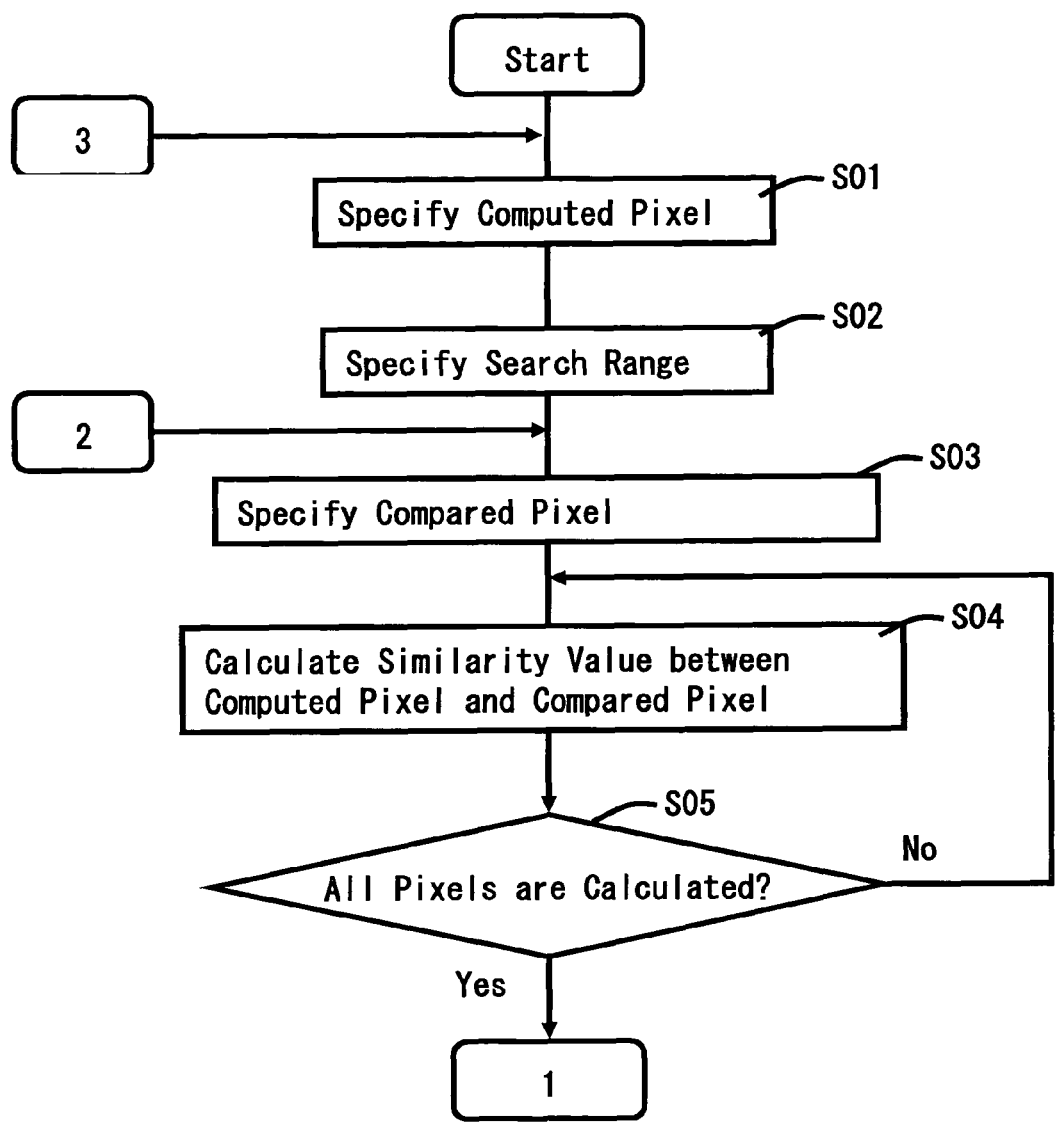
FIG. 5A is flowchart illustrating a process of calculating a similarity value.
Figure 5B:
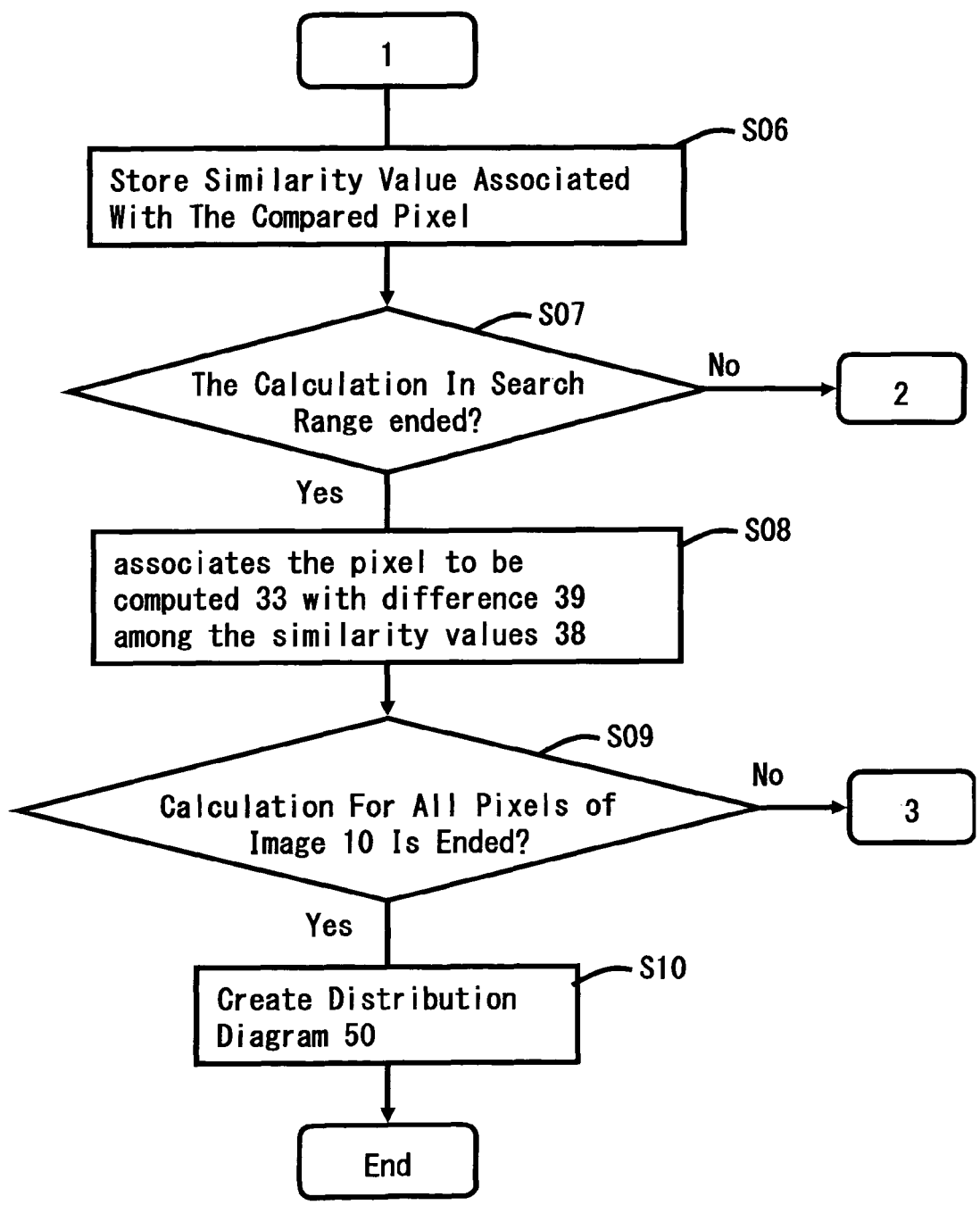
FIG. 5B is flowchart illustrating a process of calculating a similarity value.

Next, a method of calculating the similarity value 38 which is performed by the autocorrelation difference calculation module 4 will be described. FIG. 5A and FIG. 5B are flowcharts illustrating a process of calculating the similarity value 38. The autocorrelation difference calculation module 4 performs computation in the following manner so as to calculate the similarity value 38 for each of the pixels to be computed 33 set in the image 10. The autocorrelation difference calculation module 4 specifies the coordinates (x, y) of the pixel to be computed 33 (step S01). The pixel to be computed 33 illustrated in FIG. 4 has coordinates (x, y) where "x" denotes the value of the coordinate of the pixel to be computed 33 in the horizontal direction 14 in the image 10 and "y" denotes the value of the coordinate of the pixel to be computed 33 in the vertical direction 13 in the image 10. The computation region 32 is a region around the coordinates (x, y) of the pixel to be computed 33. The coordinates of each of the pixels 11 included in the computation region 32 are represented as (x+i, y+j) where "i" denotes a variable used to specify the coordinate of the pixel 11 in the horizontal direction 14 which is included in the region around the coordinates (x, y) of the pixel to be computed 33 and "j" denotes a variable used to specify the coordinate of the pixel 11 in the vertical direction 13 which is included in the region around the coordinates (x, y) of the pixel to be computed 33.

The autocorrelation difference calculation module 4 specifies the search range 31 (step S02). The search range 31 is set in advance so that the coordinates (x, y) of the pixel to be computed 33 is located in the center of the search range 31.

The autocorrelation difference calculation module 4 specifies the coordinates (x+u, y+v) of the pixel to be compared 35 in the search range 31 (step S03). The pixel to be compared 35 has the coordinates (x+u, y+v) where "u" denotes a variable used to specify the coordinate of the pixel to be compared 35 in the horizontal direction 14 which is included in the search range 31 and "v" denotes a variable used to specify the coordinate of the pixel to be compared 35 in the vertical direction 13 which is included in the search range 31. The comparison region 34 is a region around the pixel to be compared 35. The coordinates of each of the pixels 11 included in the comparison region 34 are represented as (x+u+i, y+v+j) where "i" denotes a variable used to specify the coordinate of the pixel 11 in the horizontal direction 14 which is included in the region around the coordinates (x+u, y+v) of the pixel to be compared 35 and "j" denotes a variable used to specify the coordinate of the pixel 11 in the vertical direction 13 which is included in the region around the coordinates (x+u, y+v) of the pixel to be compared 35.

Subsequently, the autocorrelation difference calculation module 4 calculates the similarity value 38 between the computation region 32 and the comparison region 34 by comparing the pixel 11 having the coordinates (x+i, y+j) included in the region around the pixel to be computed 33 with the pixel 11 having the coordinates (x+u+i, y+v+j) included in the region around the pixel to be compared 35 (step S04). The coordinates (x+i, y+j) and the coordinates (x+u+i, y+v+j) are changed by changing the values of "i" and "j".

For example, the autocorrelation difference calculation module 4 calculates the similarity value 38 between the computation region 32 and the comparison region 34 using one of the following methods: 1. A method of calculating the similarity value 38 using the sum of absolute values of differences between the luminance level of a pixel included in the computation region 32 and the luminance level of a corresponding pixel included in the comparison region 34 (hereinafter referred to as SAD (Sum of Absolute Differences)); 2. A method of calculating the similarity value 38 using the sum of square values of differences between the luminance level of a pixel included in the computation region 32 and the luminance level of a corresponding pixel included in the comparison region 34 (hereinafter referred to as SSD (Sum of Square Differences)); and 3. A method of calculating the similarity value 38 by normalization (hereinafter referred to as NCOR (Normalized Correlation)). Thus, the autocorrelation difference calculation module 4 obtains the differences between the luminance level of a pixel included in the computation region 32 and the luminance level of a corresponding pixel included in the comparison region 34, and calculates the similarity value 38 of the comparison region 34 to the computation region 32 using the sum of the luminance differences.

If the autocorrelation difference calculation module 4 calculates the similarity value 38 using SAD, it performs computation in the following manner. The autocorrelation difference calculation module 4 obtains a luminance level P1 (x+i, y+j) of the pixel 11 having the coordinate (x+i, y+j) included in the computation region 32. Subsequently, the autocorrelation difference calculation module 4 obtains a luminance level P2 (x+u+i, y+v+j) of the pixel 11 having the coordinate (x+u+i, y+v+j) included in the comparison region 34. Subsequently, the autocorrelation difference calculation module 4 computes the absolute value of the difference between the luminance level P1 (x+i, y+j) and the luminance level P2 (x+u+i, y+v+j). The autocorrelation difference calculation module 4 calculates the sum of the absolute values of the luminance differences that are obtained by individually comparing the luminance levels of all the pixels 11 included in computation region 32 with those of the corresponding pixels 11 included in the comparison region 34. The autocorrelation difference calculation module 4 sets the calculation result as the similarity value 38 of the pixel to be compared 35. The following equation (1) is used to calculate the sum of the absolute values of the luminance differences. In equation (1), "t" denotes the image 10 that is a currently obtained image.

$$SAD_{(t,x,y,u,v)} = \sum_{i,j} |P_{(t,x+i,y+j)} - P_{(t,x+u+i,y+v+j)}| \qquad \text{Equation (P)}$$

If the autocorrelation difference calculation module 4 calculates the similarity value 38 using SSD, it performs computation in the following manner.

The autocorrelation difference calculation module 4 computes the square value of the luminance difference between the luminance level P1 (x+i, y+j) and the luminance level P2 (x+u+i, y+v+j). The autocorrelation difference calculation module 4 calculates the sum of the square values of the luminance differences that are obtained by individually comparing the luminance levels of all the pixels 11 included in computation region 32 with those of the corresponding pixels 11 included in the comparison region 34. The autocorrelation difference calculation module 4 sets the calculation result as the similarity value 38 of the pixel to be compared 35. The following equation (2) is used to calculate the sum of the square values of the luminance differences. In equation (2), "t" denotes the image 10 that is a currently obtained image.

$$SSD_{(t,x,y,u,v)} = \sum_{i,j} (P_{(t,x+i,y+j)} - P_{(t,x+u+i,y+v+j)})^2 \qquad \text{Equation (2)}$$

If the autocorrelation difference calculation module 4 calculates the similarity value 38 using NCOR, it performs computation using the following equation (3). In equation (3), "t" denotes the image 10 that is a currently obtained image.

$$NCOR_{(t,x,y,u,v)} = \frac{\sum_{i,j} (P_{(t,x+i,y+j)} - \overline{P}_{(t,x,y)}) \cdot (P_{(t,x+u+i,y+v+j)} - \overline{P}_{(t,x+u,y+v)})}{\sqrt{\sum_{i,j} (P_{(t,x+i,y+j)} - \overline{P}_{(t,x,y)})^2} \cdot \sqrt{\sum_{i,j} (P_{(t,x+u+i,y+v+j)} - \overline{P}_{(t,x+u,y+v)})^2}} \qquad \text{Equation (3)}$$

The autocorrelation difference calculation module 4 repeats computation until the luminance levels of all the pixels 11 included in the computation region 32 are individually compared with those of the corresponding pixels 11 included in the comparison region 34 so as to calculate luminance differences (No in step S05). If the autocorrelation difference calculation module 4 calculates the sum of the luminance differences (Yes in step S05), it associates the calculation result with the pixel to be compared 35 as the similarity value 38 (the similarity value between the first region and the second region) and stores the similarity value 38 associated with the pixel to be compared 35 (step S06).

The autocorrelation difference calculation module 4 repeats the above-described process until all the pixels to be compared 35 included in the search range 31 are individually compared with the pixel to be computed 33 so as to calculate the similarity value 38 (No in step S07). If the similarity values 38 of all the pixels to be compared 35 included in the search range 31 are calculated (Yes in step S07), the autocorrelation difference calculation module 4 associates the pixel to be computed 33 with the similarity value 38 denoting the feature of the computation region 32 (the first region) which is selected from among the similarity values 38 of all the pixels to be compared 35 included in the search range 31 as the difference 39 among the similarity values 38 (step S08). The difference 39 among the similarity values 38 is large when the image of the computation region 32 includes a corner, and is small when the image of the computation region 32 is, for example, the image of a straight portion or the image of an asphalt surface. The difference 39 among the similarity values 38, which has been associated with the pixel to be computed 33 in step S08, is used for vehicle detection that will be described later.

Here, a method of acquiring the difference 39 among the similarity values 38, which is associated with the pixel to be computed 33 by the autocorrelation difference calculation module 4, will be described. The autocorrelation difference calculation module 4 computes the difference 39 among the similarity values 38, which is associated with the pixel to be computed 33, in the following manner.

All the pixels to be compared 35 set in the search range 31 include the pixel to be computed 33. When the pixel to be computed 33 is set as the pixel to be compared 35, the similarity value 38 calculated in this case is a value indicating that the pixel to be compared 35 is most similar to the pixel to be computed 33 of all the pixels to be compared 35 included in the search range 31. Accordingly, the similarity value 38 calculated when the pixel to be computed 33 is set as the pixel to be compared 35 is required to be removed.

If the similarity value 38 is calculated using SAD or SSD, the similarity value 38 calculated when the pixel to be computed 33 is set as the pixel to be compared 35, that is, the same pixel functions as the pixel to be computed 33 and the pixel to be compared 35, is a value of zero indicating that the pixel to be compared 35 is most similar to the pixel to be computed 33. If the similarity value 38 is calculated using SAD or SSD and the pixels to be compared 35 include the pixel to be computed 33, the autocorrelation difference calculation module 4 detects the pixel to be compared 35 having the second similarity value 38. For example, the autocorrelation difference calculation module 4 removes the similarity value 38 obtained by comparing the pixel to be computed 33 with itself, and selects the smallest similarity value 38 from among the similarity values 38 that have been individually associated with the pixels to be compared 35 included in the search range 31 and then been stored. The autocorrelation difference calculation module 4 sets the selected similarity value 38 as the difference 39 among the similarity values 38 to be associated with the pixel to be computed 33. The following equation (4)

is used to calculate the difference 39 among the similarity values 38 using SAD. The following equation (5) is used to calculate the difference 39 among the similarity values 38 using SSD. In these equations, "t" denotes the image 10 that is a currently obtained image.

$$ACD_{(t,x,y)} = \min_{u,v(u=v\neq 0)} SAD_{(t,x,y,u,v)} \qquad \text{Equation (4)}$$

$$ACD_{(t,x,y)} = \min_{u,v(u=v\neq 0)} SSD_{(t,x,y,u,v)} \qquad \text{Equation (5)}$$

If the similarity value 38 is calculated using NCOR, the similarity value 38 calculated when the pixel to be computed 33 is set as the pixel to be compared 35, that is, the same pixel functions as the pixel to be computed 33 and the pixel to be compared 35, becomes a value of one. If the similarity value 38 is calculated using NCOR and the pixels to be compared 35 include the pixel to be computed 33, the autocorrelation difference calculation module 4 detects the pixel to be compared 35 having the second similarity value 38. For example, the autocorrelation difference calculation module 4 removes the similarity value 38 obtained by comparing the pixel to be computed 33 with itself, and selects the largest similarity value 38 from among the similarity values 38 that have been individually associated with the pixels to be compared 35 included in the search range 31 and then been stored. Subsequently, the autocorrelation difference calculation module 4 sets a value obtained by subtracting the second similarity value 38 from 1 as the difference 39 among the similarity values 38 to be associated with the pixel to be computed 33. The following equation (6) is used to calculate the difference 39 among the similarity values 38 using NCOR. In equation (6), "t" denotes the image 10 that is a currently obtained image.

$$ACD_{(t,x,y)} = 1 - \min_{u,v(u=v\neq 0)} NCOR_{(t,x,y,u,v)} \qquad \text{Equation (6)}$$

Next, the feature of the difference 39 among the similarity values 38 will be described. The feature of the difference 39 among the similarity values 38, which is calculated by the autocorrelation difference calculation module 4, is that the value thereof is large when a corner exists in the computation region 32. The vehicle 16 has many corners such as the corner portions of a windshield, side mirrors, a front grille, and a front number plate when viewed from the front. These corner portions of the vehicle 16 are included in the image 10 as corners. The similarity value 38 of a region including a corner is larger than that of a region including no corner. The reason for this is that the computation region 32 and the comparison region 34 rarely include the identically-shaped corner and a large number of pixels included in the computation region 32 differ from those included in the comparison region 34 in luminance level.

On the other hand, if the computation region 32 includes no corners, the difference 39 among the similarity values 38, which is calculated by the autocorrelation difference calculation module 4, is small. For example, when the computation region 32 is a straight edge portion such as a roof portion of the vehicle 16 or an asphalt portion in which similar colors are used, the difference 39 among the similarity values 38 is small.

The autocorrelation difference calculation module 4 performs the above-described computation for all the pixels 11 included in the image 10 by setting each of the pixels 11 as the pixel to be computed 33 so as to obtain the difference 39 among the similarity values 38 (step S09). If the difference 39 among the similarity values 38 is not associated with each of all the pixels 11 included in the image 10 (No in step S09), the autocorrelation difference calculation module 4 sets the next pixel 11 as the pixel to be computed 33 so as to calculate the difference 39 among the similarity values 38. On the other hand, if the difference 39 among the similarity values 38 is associated with each of all the pixels to be computed 33 set in the image 10 (Yes in step S09), the autocorrelation difference calculation module 4 creates a distribution diagram 50 denoting the distribution of the differences 39 among the similarity values 38 which are individually associated with the pixels to be computed 33 set in the image 10 (step S10).

Here, the description of a road mark included in the image 10 will be made. The distribution diagram 50 is a diagram 50 denoting the distribution of the differences 39 among the similarity values 38. In a region including a corner in the image 10, there are a large number of the pixels 11 having a large value of the difference 39 among the similarity values 38. In a region including the corner of a road mark, however, there also are a large number of the pixels 11 having a large value of the difference 39 among the similarity values 38. Accordingly, such a road mark causes false detection of the vehicle 16. It is required to delete an unnecessary part of the background such as a road mark from the image 10 whose data is stored in the image memory 3. For example, the road mark is the mark of a crosswalk, the centerline of a road, or a line denoting a boundary between a sidewalk and a roadway. In this embodiment, processing for deleting information about a crosswalk in the image 10 is performed. In this embodiment, a crosswalk is illustrated in parallel to the horizontal direction 14 in the image 10. The deletion of a road mark is performed each time the image 10 is obtained. If a road mark region is deleted in advance, the vehicle 16 on the road mark is also deleted. In this case, the vehicle 16 cannot be detected.

Figure 6:
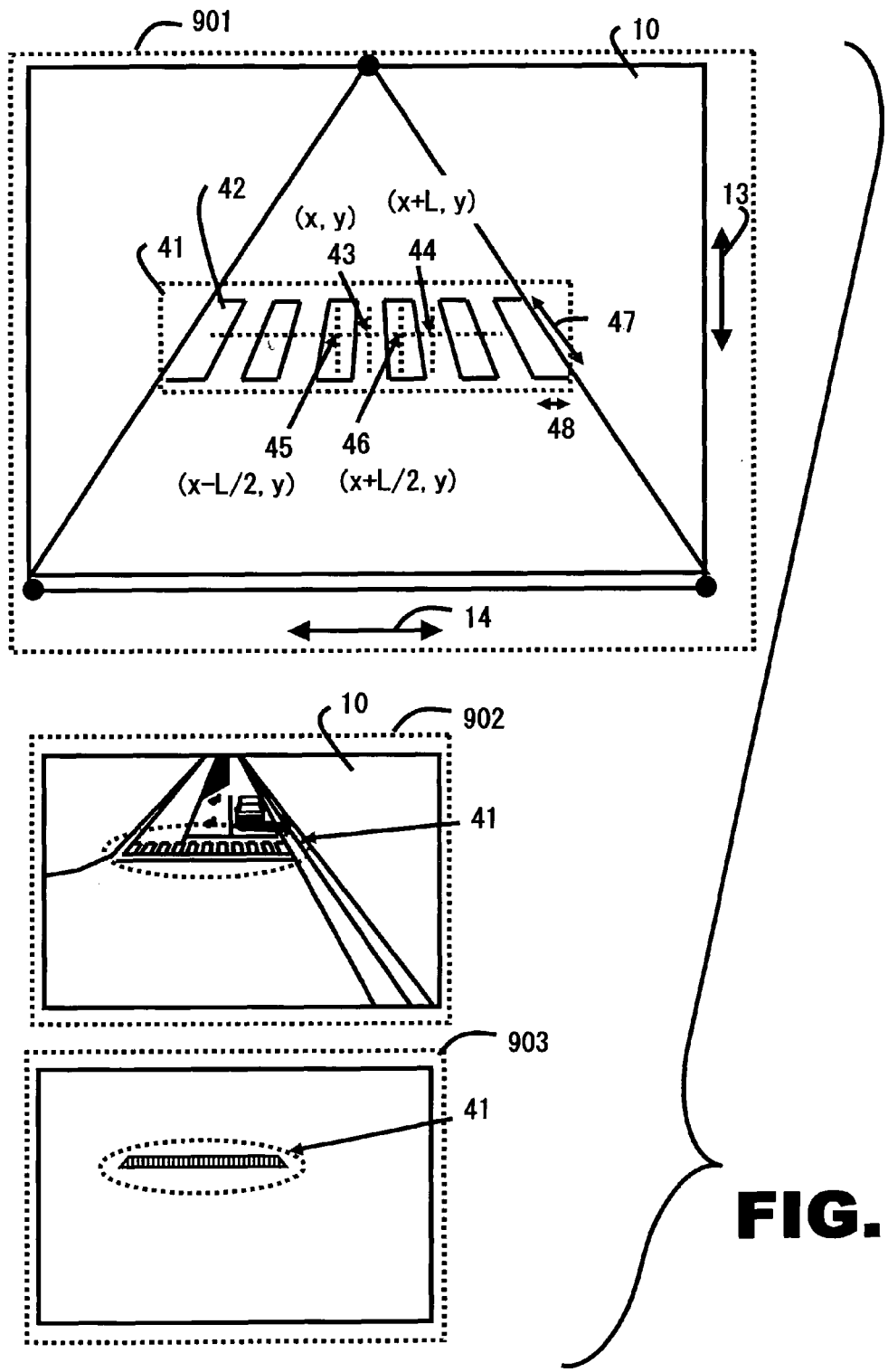
FIG. 6 is a diagram illustrating an example of a crosswalk.
Figure 7:
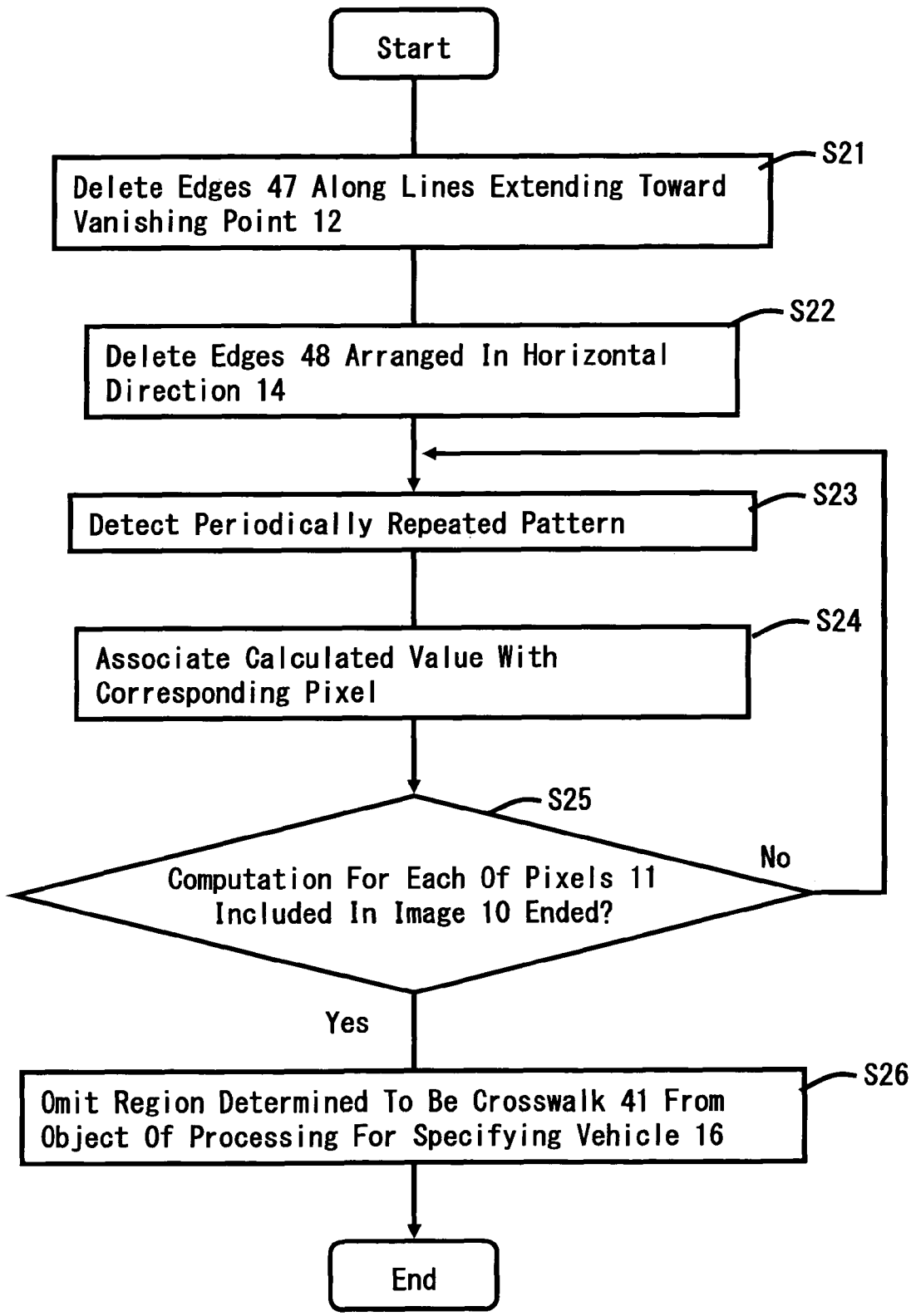
FIG. 7 is a flowchart illustrating a process of deleting the region of a crosswalk from an image which is performed by a road mark deletion module.

FIG. 6 illustrates an example of a crosswalk 41. The crosswalk 41 illustrated image 901, 902 and 903 in FIG. 6 is a region in which a white strip pattern 42 is illustrated on the roadway 15. The road mark deletion module 5 detects the region of the crosswalk 41 from the image 10 in the following manner. The region of the crosswalk 41 detected by the road mark deletion module 5 is not subjected to computation performed for detection of the vehicle 16. FIG. 7 is a flowchart illustrating a process of deleting the region of the crosswalk 41 from the image 10 which is performed by the road mark deletion module 5.

First, the road mark deletion module 5 deletes edges 47 along the lines extending toward the vanishing point 12 (step S21). Subsequently, the road mark deletion module 5 deletes edges 48 arranged in the horizontal direction 14 at regular intervals in the image 10 (step S22). The strip pattern 42 of the crosswalk 41 is in the horizontal direction 14 in the image 10. Subsequently, the road mark deletion module 5 detects a periodically repeated pattern that can be detected as the crosswalk 41 (step S23). A width 49 of each stripe in the strip pattern 42 of the crosswalk 41 is specified in advance. Accordingly, the road mark deletion module 5 can store in advance the width 49 of each stripe in the strip pattern 42 in the horizontal direction 14 which is associated with a coordinate in the vertical direction 13 in the image 10.

The road mark deletion module 5 obtains Ap(x, y) that is an average of a luminance level P3(x, y) at coordinates 43 (x, y), which are the coordinates of a current pixel to be computed, and a luminance level P4(x+L, y) at coordinates 44 (x+L, y), which are moved from the coordinates 43 (x, y) in the horizontal direction 14 by a predetermined amount of L using equation (7). The predetermined amount of L corresponds to the width of each stripe in the strip pattern 42 of the crosswalk 41 in the horizontal direction 14 which is associated with the coordinate "y" in the vertical direction 13 in the image 10. The value of Ap(x, y) is an average of the luminance level P3(x, y) and the luminance level P4(x+L, y), and therefore becomes large when the pixel having the coordinates 43 (x, y) and the pixel having the coordinates 44 (x+L, y) exist on the white portion of the crosswalk.

$$Ap_{(x,y)} = \frac{(P3_{(x,y)} + P4_{(x+L,y)})}{2} \qquad \text{Equation (7)}$$

The road mark deletion module 5 obtains Am(x, y) that is an average of a luminance level P5(x−L/2, y) at coordinates 45 (x−L/2, y), which are moved from the coordinates 43 (x, y) in the horizontal direction 14 by a predetermined amount of (−L/2), and a luminance level P6(x+L/2, y) at coordinates 46 (x+L/2, y), which are moved from the coordinates 43 (x, y) in the horizontal direction 14 by a predetermined amount of (L/2) using equation (8). The value of Am(x, y) is an average of the luminance level P5(x−L/2, y) and the luminance level P6(x+L/2, y), and therefore becomes large when the pixel having the coordinates 45 (x−L/2, y) and the pixel having the coordinates 46 (x+L/2, y) exist on the white portion of the crosswalk.

$$Am_{(x,y)} = \frac{\left(P5_{(x-\frac{L}{2},y)} + P6_{(x+\frac{L}{2},y)}\right)}{2} \qquad \text{Equation (8)}$$

There is an inverse relationship between the luminance level Ap and the luminance level Am, since the luminance level P5(x−L/2, y) is obtained at the coordinates moved from the coordinates at which the luminance level P3(x, y) is obtained in the horizontal direction 14 by the amount of L/2 and the luminance level P6(x+L/2, y) is obtained at the coordinates moved from the coordinates at which the luminance level P4(x+L, y) is obtained in the horizontal direction 14 by the amount of L/2. If the coordinates at which the luminance level P3(x, y) and the luminance level P4(x+L, y) are obtained are placed in the white-painted portion in the strip pattern 42 of the crosswalk 41, the coordinates at which the luminance level P5(x−L/2, y) and the luminance level P6(x+L/2, y) are obtained are placed in the asphalt portion in the strip pattern 42 of the crosswalk 41. That is, when the value of Ap(x, y) is the maximum value, the value of Am(x, y) is the minimum value. On the other hand, when the value of Ap(x, y) is the minimum value, the value of Am(x, y) is the maximum value.

The road mark deletion module 5 calculates Cp (x, y) that is the absolute value of the difference between the luminance level P3(x, y) and the luminance level P4(x+L, y) using equation (9). When the luminance level P3(x, y) and the luminance level P4(x+L, y) are obtained under similar conditions, the value of Cp (x, y) is small. For example, when the luminance level P3(x, y) and the luminance level P4(x+L, y) are obtained at coordinates placed in the white-painted portion or the asphalt portion in the strip pattern 42 of the crosswalk 41, the value of Cp (x, y) is small.

$$Cp_{(x,y)} = |P3_{(x,y)} - P4_{(x+L,y)}| \qquad \text{Equation (9)}$$

The road mark deletion module 5 calculates Cm (x, y) that is the absolute value of the difference between the luminance level P5(x−L/2, y) and the luminance level P6(x+L/2, y) using equation (10). When the luminance level P5(x−L/2, y) and the luminance level P6(x+L/2, y) are obtained under similar conditions, the value of Cm (x, y) is small. For example, when the luminance level P5(x−L/2, y) and the luminance level P6(x+L/2, y) are obtained at coordinates placed in the white-painted portion or the asphalt portion in the strip pattern 42 of the crosswalk 41, the value of Cm (x, y) is small.

$$Cm_{(t,x,y)} = \left|P5_{(x-\frac{L}{2},y)} - P6_{(x+\frac{L}{2},y)}\right| \qquad \text{Equation (10)}$$

The road mark deletion module 5 calculates a feature point Ecw of the crosswalk 41 using Ap(x, y), Am(x, y), Cp (x, y), and Cm (x, y) in equation (11).

$$Ecw_{(x,y)} = |Ap_{(x,y)} - Am_{(x,y)}| - Cp_{(x,y)} - Cm_{(x,y)} \qquad \text{Equation (11)}$$

The value of Ecw is large when there is an inverse relationship between Ap(x, y) and Am(x, y). Furthermore, the value of Ecw is also large when the difference absolute values Cp (x, y) and Cm (x, y) are small. Accordingly, the value of Ecw is large in the region of the crosswalk 41.

The road mark deletion module 5 associates the calculated value of Ecw with a corresponding pixel (the pixel 11) (step S24). The road mark deletion module 5 performs the above-described computation for each of the pixels 11 included in the image 10 (step S25). The road mark deletion module 5 omits a region determined to be the crosswalk 41 from the object of processing for specifying the vehicle 16 (step S26). More specifically, the road mark deletion module 5 associates a pixel determined to be one of pixels forming the crosswalk 41 with a corresponding pixel included in the distribution diagram 50 created by the autocorrelation difference calculation module 4 so as to omit the pixel from the object of the processing for detecting the vehicle 16. The autocorrelation difference calculation module 4 may create the distribution diagram 50 after the road mark deletion module 5 has removed the region of the crosswalk 41 from the image 10. By removing the region of the crosswalk 41, the image processing apparatus 1 can reduce the risk of falsely detecting the vehicle 16 in the processing for specifying the vehicle 16. The road mark deletion module 5 obtains information about the region of the crosswalk 41 illustrated in the image 903 of FIG. 6, which should be deleted, from the image 10 illustrated in the image 902 of FIG. 6.

Subsequently, the image processing apparatus 1 detects a region having a shape matching a vehicle (subject) shape defined in advance as a vehicle portion in the image. The shape of the region is determined in accordance with the distribution of the similarity values each denoting the feature of the computation region 32. Pixels each having a large value of the difference 39 among the similarity values 38 show that there are no similar region in surroundings. The image processing apparatus 1 detects the vehicle 16 from the distribution diagram 50 created by the autocorrelation difference calculation module 4 and the road mark deletion module 5.

Figure 8A:
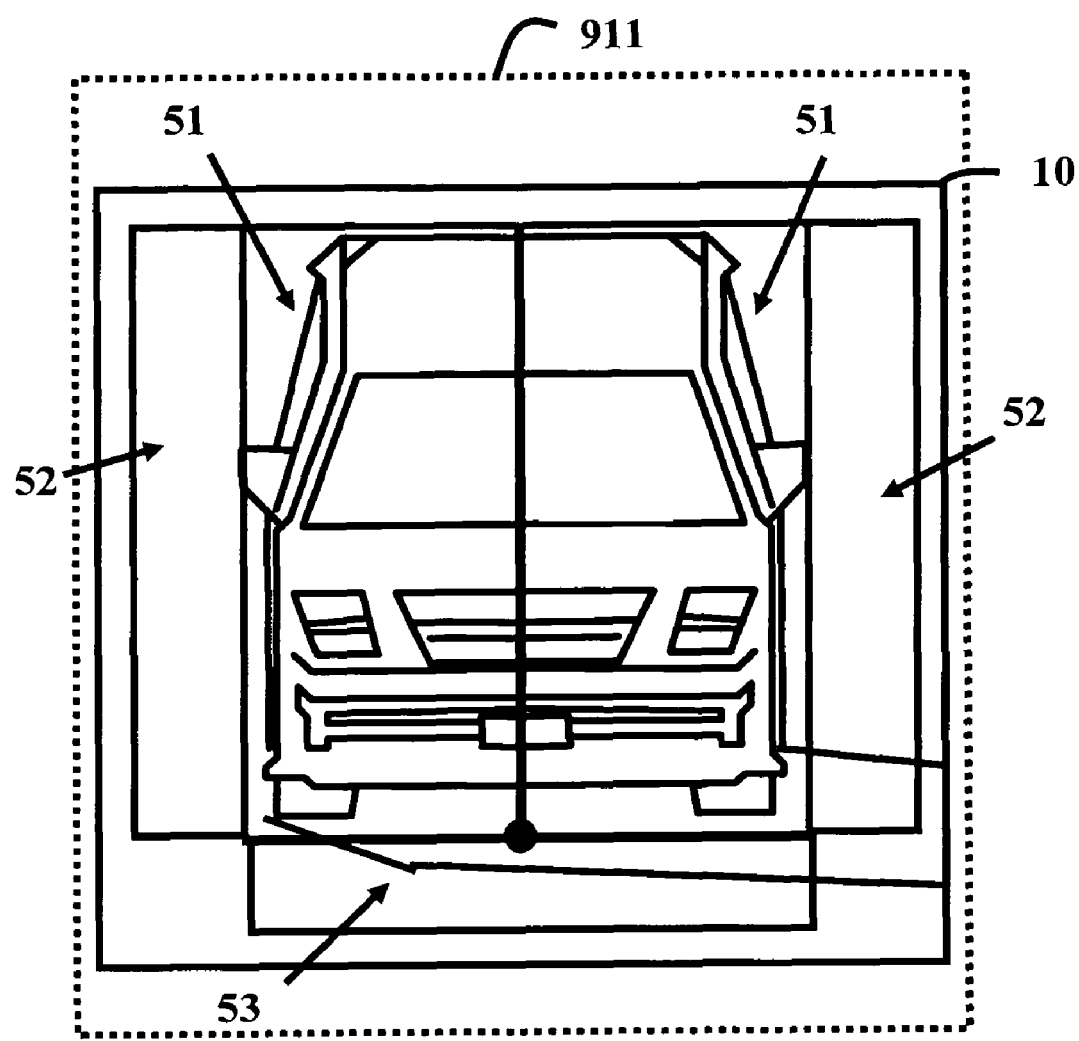
FIG. 8A is a diagram illustrating a region including a vehicle in an original image.
Figure 8B:
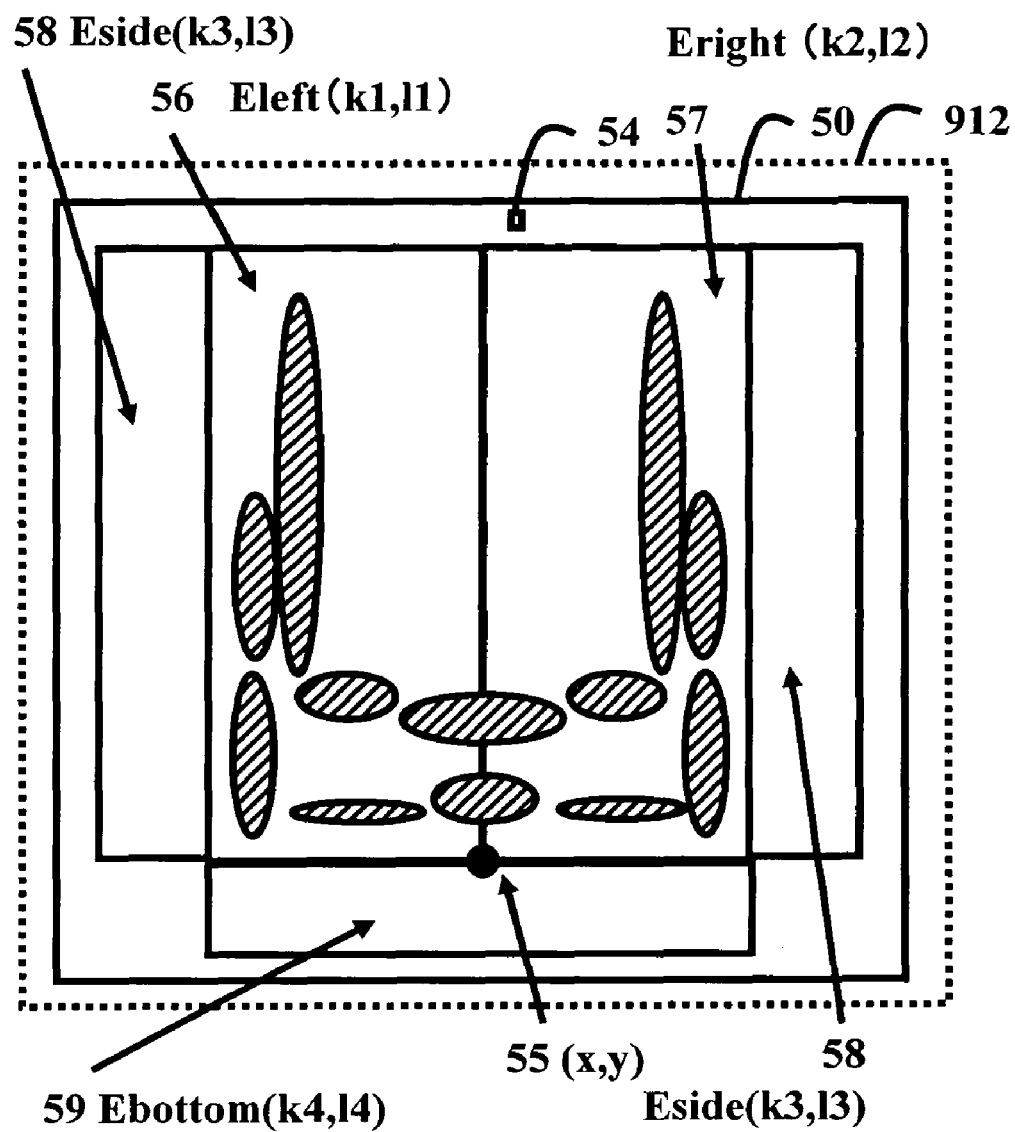
FIG. 8B is a diagram illustrating the region including the vehicle in a distribution diagram.

First, the relationship between the vehicle 16 and the difference 39 among the similarity values 38 (a similarity value denoting a feature) will be described. The image processing apparatus 1 detects the vehicle 16 from the distribution diagram 50 using the symmetrical shape of the vehicle 16. FIG. 8A illustrates the image of the vehicle 16 in the image 10. FIG. 8B illustrates the image of the vehicle 16 in the distribution diagram 50. In this embodiment, the camera 2 captures the image of the vehicle 16 from the front or back. The front or back portion of the vehicle 16 has a symmetrical shape.

The difference 39 among the similarity values 38 which is associated with each pixel included in a pixel group 51 on either side of the vehicle 16 is large, since there are many corner portions on the left and right side faces of the vehicle 16. The difference 39 among the similarity values 38 which is associated with each pixel included in a pixel group in the front portion of the vehicle 16 is large, since there are also many corner portions in the front portion. The front portion of the vehicle 16 is symmetric with respect to the centerline of the vehicle 16. The difference 39 among the similarity values 38 which is associated with each pixel included in a pixel group 52 outside the left and right side faces of the vehicle 16 is small, since the outside of the vehicle 16 is an asphalt portion. The difference 39 among the similarity values 38 which is associated with each pixel included in a pixel group 53 in front of the front portion of the vehicle 16, that is, in front of the vehicle 16, is small, since the outside of the vehicle 16 is an asphalt portion. A region in front of the vehicle 16 moving toward the front is placed below the vehicle 16 in the two-dimensional image 10.

On the basis of the state of the distribution diagram 50 in which the pixel group 51 is placed on either side of the vehicle 16, the pixel group 52 is placed outside the left and right side faces of the vehicle 16, and the pixel group 53 is placed in front of the vehicle 16, a pattern functioning as the feature of a vehicle is defined in advance. In this embodiment, the pattern functioning as the feature of the vehicle 16 is defined so that the following first to third conditions are satisfied. The first condition is that the pixel group 51 including pixels each having a large value of the difference 39 among the similarity values 38 is placed on either side of the vehicle 16. The second condition is that the pixel group 52 including pixels each having a small value of the difference 39 among the similarity values 38 is placed outside the left and right side faces of the vehicle 16. The third condition is that the pixel group 53 including pixels each having a small value of the difference 39 among the similarity values 38 is placed below the vehicle 16.

The pattern feature value calculation module 6 included in the image processing apparatus 1 detects a region satisfying the above-described conditions from the distribution diagram 50.

Figure 9:
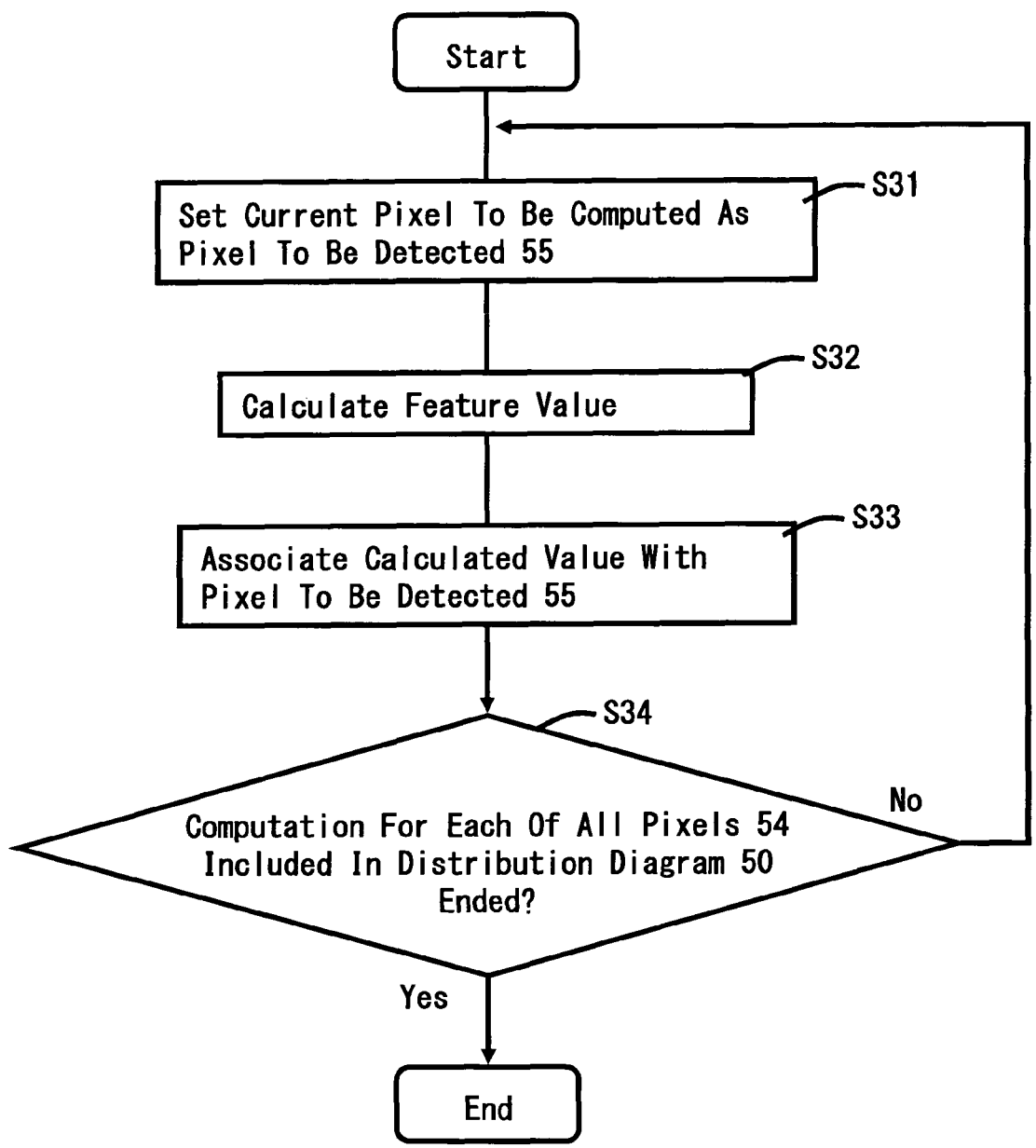
FIG. 9 is a flowchart illustrating a process of detecting a region including a vehicle from a distribution diagram which is performed by a pattern feature value calculation module.

FIG. 9 is a flowchart illustrating a process of detecting a region including the vehicle 16 from the distribution diagram 50 which is performed by the pattern feature value calculation module 6. The pattern feature value calculation module 6 performs computation for each of pixels 54 included in the distribution diagram 50 illustrated in FIG. 8B in the following manner. First, the pattern feature value calculation module 6 sets a current pixel to be computed (one of the pixels 54) as a pixel to be detected 55 in the distribution diagram 50 (step S31). The pattern feature value calculation module 6 sets the pixel to be detected 55 as a reference position and calculates a feature value (step S32). More specifically, the pattern feature value calculation module 6 obtains the distribution of the differences 39 among the similarity values 38 using the following equations (12) to (16). In these equations, "t" denotes the image 10 that is a currently obtained image.

$$E_{left(t,x,y)} = \sum_{k1,l1} P_{(t,x-k1,y+l1)} \quad \text{Equation (12)}$$

$$E_{right(t,x,y)} = \sum_{k2,l2} P_{(t,x+k2,y+l2)} \quad \text{Equation (13)}$$

Equation (12) is used to obtain Eleft 56 that is the sum of the differences 39 among the similarity values 38 which are individually associated with the pixels 54 in a region that is specified by setting the coordinates of the pixel to be detected 55 as reference coordinates and changing the values of "k1" and "l1". Equation (13) is used to obtain Eright 57 that is the sum of the differences 39 among the similarity values 38 which are individually associated with the pixels 54 in a region that is specified by setting the coordinates of the pixel to be detected 55 as reference coordinates and changing the values of "k2" and "l2". Eleft 56 is used to obtain the distribution of the differences 39 among the similarity values 38 which are individually associated with pixels in a region between the centerline of the vehicle 16 and the left side face of the vehicle 16. Eright 57 is used to obtain the distribution of the differences 39 among the similarity values 38 which are individually associated with pixels in a region between the centerline of the vehicle 16 and the right side face of the vehicle 16. In the side face portions of the vehicle 16 and the front portion of the vehicle 16 in which there are many corner portions, many pixels each having a large value of the difference 39 among the similarity values 38 are distributed. In equations (12) and (13), "t" denotes the image 10 that is a currently obtained image.

$$E_{side(t,x,y)} = \sum_{k3,l3} P_{(t,x+k3,y+l3)} \quad \text{Equation (14)}$$

$$E_{bottom(t,x,y)} = \sum_{k4,l4} P_{(t,x+k4,y+l4)} \quad \text{Equation (15)}$$

Equation (14) is used to obtain Eside 58 that is the sum of the differences 39 among the similarity values 38 which are individually associated with the pixels 54 in regions on the left and right sides of the distribution diagram 50 which are specified by setting the coordinates of the pixel to be detected 55 as reference coordinates and changing the values of "k3" and "l3". Eside 58 is used to obtain the distribution of the differences 39 among the similarity values 38 which are individually associated with pixels in a region outside the side faces of the vehicle 16. In the region outside the side faces of the vehicle 16 which is an asphalt portion, many pixels each having a small value of the difference 39 among the similarity values 38 are distributed.

Equation (15) is used to obtain Ebottom 59 that is the sum of the differences 39 among the similarity values 38 which are individually associated with the pixels 54 in a region on the lower side of the distribution diagram 50 which is specified by setting the coordinates of the pixel to be detected 55 as reference coordinates and changing the values of "k4" and "l4". Ebottom 59 is used to obtain the distribution of the differences 39 among the similarity values 38 which are individually associated with pixels in a region below the vehicle 16. If the pixel to be detected 55 serving as the reference position is placed at the bottom of the front portion of the vehicle 16, the region in which Ebottom 59 is obtained is a road. Accordingly, in the region below the vehicle 16, many pixels each having a small value of the difference 39 among the similarity values 38 are distributed.

The pattern feature value calculation module 6 substitutes values obtained from the above-described equations (12) to (15) into equation (16), thereby obtaining a value of 60E(x, y) denoting the feature of the vehicle 16 which is associated with the pixel to be detected 55. In equation (16), "t" denotes the image 10 that is a currently obtained image.

$$E_{(t,x,y)} = E_{left(t,x,y)} + E_{right(t,x,y)} - |E_{left(t,x,y)} - E_{right(t,x,y)}| -$$
$$C_{side}E_{side(t,x,y)} - C_{bottom}E_{bottom(t,x,y)}$$

Equation (16)

The value of E(x, y) is large when the values of Eleft 56 and Eright 57 are large. If the pixel to be detected 55 is on the centerline of the vehicle 16, the regions in which Eleft 56 and Eright 57 are obtained are diametrically opposed to each other. Accordingly, the values of Eleft 56 and Eright 57 are close to each other. If the regions in which Eleft 56 and Eright 57 are obtained are diametrically opposed to each other, the value of E(x, y) is a small. The value of E(x, y) is small when the value of Eside 58 is small. In equation 16, the values of Cside and Cbottom are set by a designer in accordance with the condition of a road at which the camera 2 performs image capturing. The pattern feature value calculation module 6 associates the calculated value of E(x, y) with the pixel to be detected 55 (step S33).

The pattern feature value calculation module 6 performs the above-described computation for each of all the pixels 54 included in the distribution diagram 50 (step S34). Using the computation results, the pattern feature value calculation module 6 can obtain the coordinates of a region in the vertical direction 13 and the horizontal direction 14 in which it can be considered that the vehicle 16 exists.

The result of the computation, which is performed by the pattern feature value calculation module 6 for detection of the vehicle 16, is not affected by shadow included in the image 10, since the autocorrelation difference calculation module 4 obtains the differences 39 among the similarity values 38 which are individually associated with the pixels included in the image 10 and creates the distribution diagram 50 using the obtained differences 39 among the similarity values 38.

Figure 10:
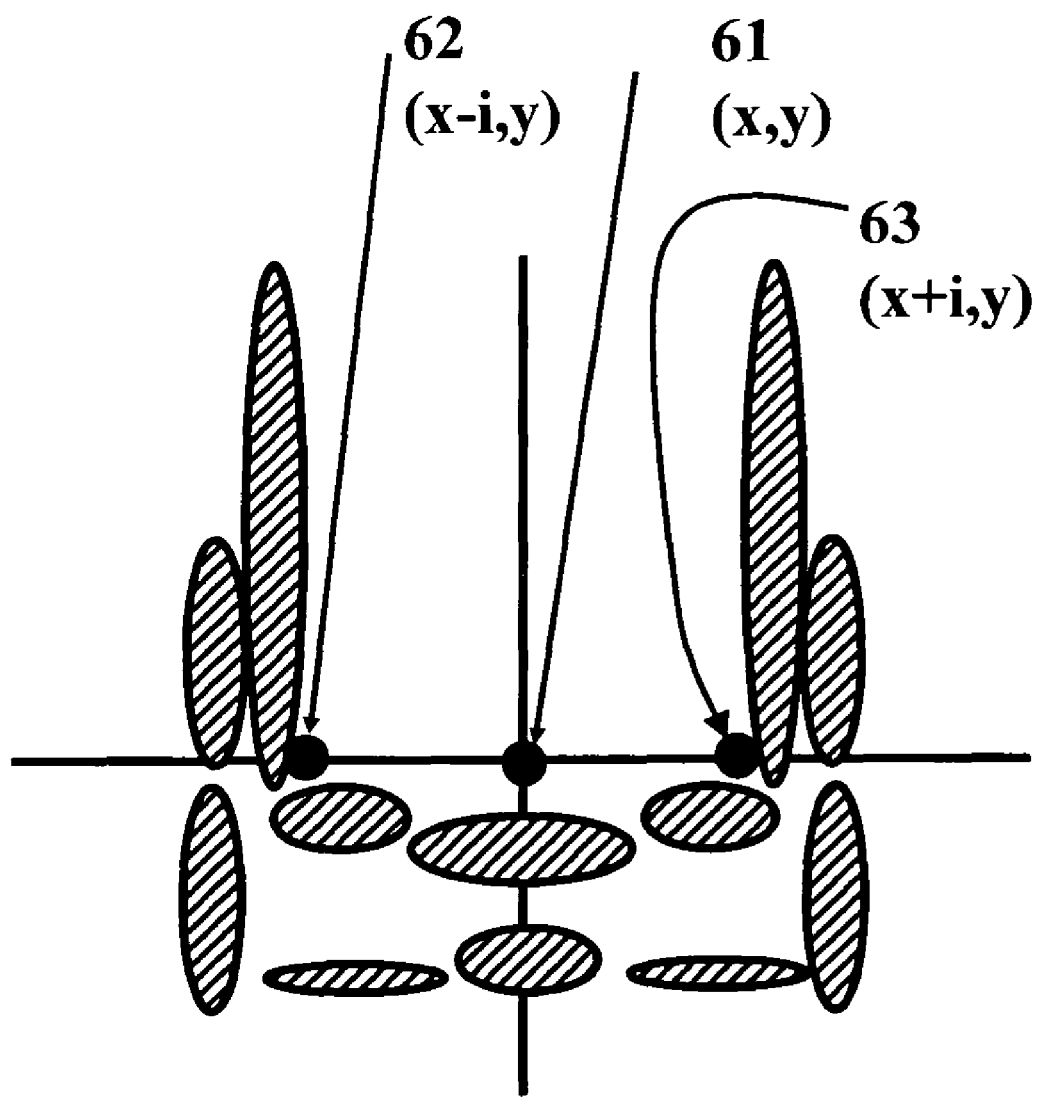
FIG. 10 is a diagram illustrating the relationship between a distribution diagram and the symmetry of a vehicle.

On the other hand, the symmetry feature value calculation module 7 included in the image processing apparatus 1 computes center coordinates of the vehicle 16 from the distribution diagram 50. FIG. 10 is a diagram describing the relationship between the distribution diagram 50 and the symmetry of the vehicle 16. The vehicle 16 is symmetrical in shape. Accordingly, in the distribution diagram 50 denoting the distribution of the difference 39 among the similarity values 38, the pattern of the distribution is symmetric with respect to the centerline of the vehicle 16. The symmetry feature value calculation module 7 specifies the position of the vehicle 16 using the symmetry of the vehicle 16. The determination of the symmetry of the vehicle 16 is performed in the following manner.

Figure 11:
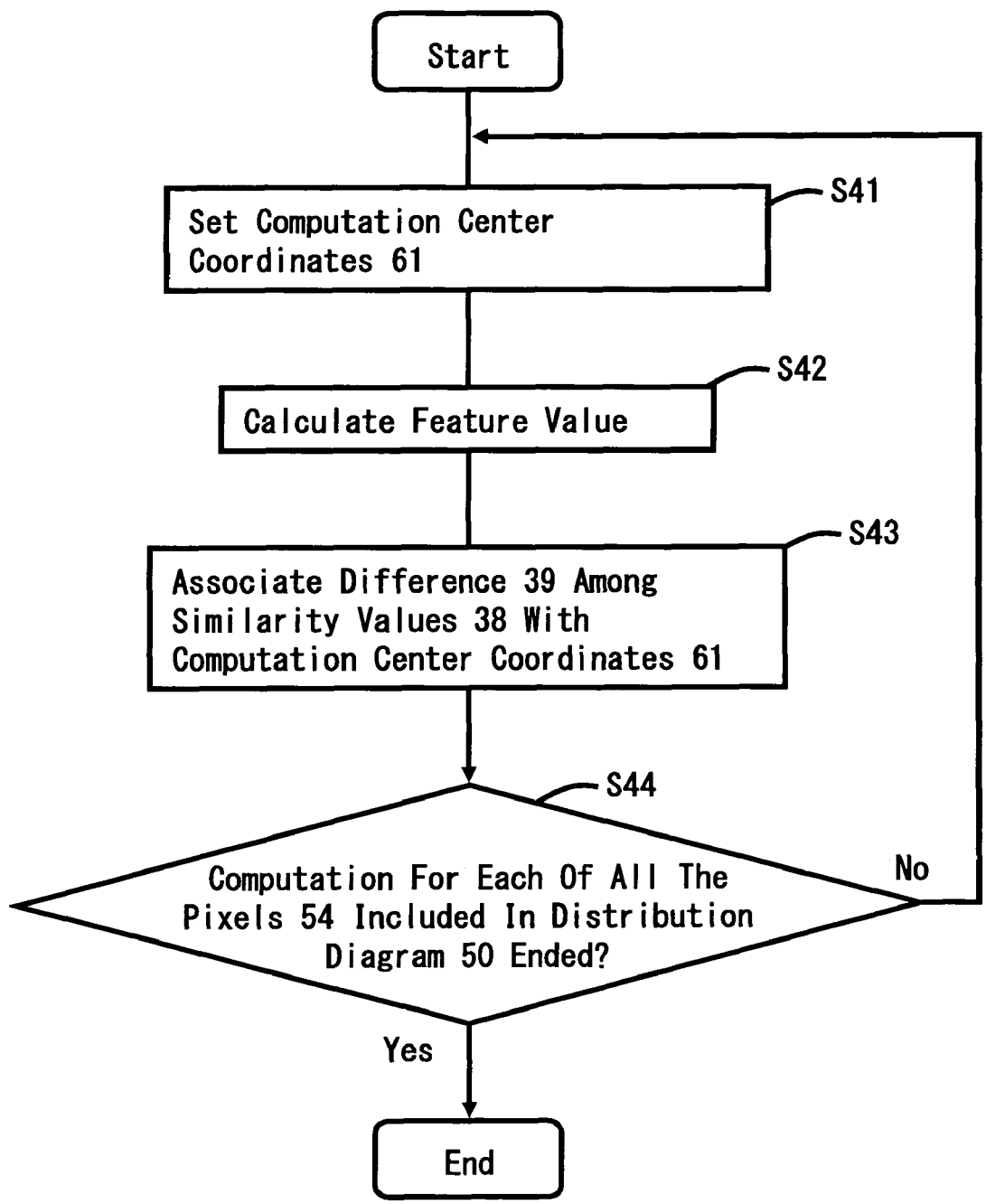
FIG. 11 is a flowchart illustrating a process of detecting a region including a vehicle from a distribution diagram which is performed by a symmetry feature value calculation module.

FIG. 11 is a flowchart illustrating a process of detecting a region including the vehicle 16 from the distribution diagram 50 which is performed by the symmetry feature value calculation module 7.

The symmetry feature value calculation module 7 sets computation center coordinates 61 (x, y) as current coordinates to be computed (step S41). Subsequently, the symmetry feature value calculation module 7 calculates the feature value of the computation center coordinates 61 (x, y) (step S42). More specifically, the symmetry feature value calculation module 7 obtains a luminance level at coordinates that are distant from the computation center coordinates 61 (x, y) by the amount of "+i" in the positive horizontal direction 14 and a luminance level at coordinates that are distant from the computation center coordinates 61 (x, y) by the amount of "−i" in the negative horizontal direction 14. The value of "i" is determined as appropriate so that it falls within a range required to calculate the symmetry of the vehicle 16. For example, the value of "i" is determined so that it falls within a range corresponding to half of the width of the vehicle 16 associated with the coordinate in the vertical direction 13 in the image 10. The symmetry feature value calculation module 7 obtains a luminance level P7 (x+i, y) at coordinates 63 (x+i, y), which are distant from the computation center coordinates 61 (x, y) in the positive horizontal direction 14, and a luminance level P8 (x−i, y) at coordinates 62 (x−i, y), which are distant from the computation center coordinates 61 (x, y) in the negative horizontal direction 14.

The symmetry feature value calculation module 7 calculates S(i) that is the sum of the luminance level P7 (x+i, y) and the luminance level P8 (x−i, y) using equation (17).

$$S_{(i)} = P7_{(t,x+i,y)} + P8_{(t,x-i,y)}$$

Equation (17)

The value of S(i) is large when the values of the luminance level P7 (x+i, y) and the luminance level P8 (x−i, y) are large. In equation (17), "t" denotes the image 10 that is a currently obtained image. The symmetry feature value calculation module 7 calculates D(i) that is the difference between the luminance level P7 (x+i, y) and the luminance level P8 (x−i, y) using equation (18).

$$D_{(i)} = P7_{(t,x+i,y)} - P8_{(t,x-i,y)}$$

Equation (18)

The value of D(i) is small when the values of the luminance level P7 (x+i, y) and the luminance level P8 (x−i, y) are close to each other. Accordingly, the value of D(i) denotes the balance between the luminance level P7 (x+i, y) and the luminance level P8 (x−i, y). In equation (18), "t" denotes the image 10 that is a currently obtained image.

The symmetry feature value calculation module 7 calculates Esym (x, y) that is the centerline of the vehicle 16 using equation (19).

$$E_{sym(t,x,y)} = \sum_i |S_{(i)}| - \sum_i |D_{(i)}|$$

Equation (19)

The value of Esym (x, y) is obtained by subtracting the sum of absolute values of the values of D(i) from the sum of absolute values of the values of S(i). The values of S(i) and the values of D(i) are obtained by changing the value of "i" in equations (17) and (18), respectively. Accordingly, the value of Esym (x, y) is large when a luminance level on the left side of a region to be computed and a luminance level on the right side of the region to be computed are equal to each other and the luminance levels on both sides of the region are high. The symmetry feature value calculation module 7 associates the value of Esym (x, y) calculated in step S32 with the computation center coordinates 61 (x, y) (step S43).

By performing the above-described computation for each of all the pixels 54 included in the distribution diagram 50 (step S44), the symmetry feature value calculation module 7 can detect the centerline of the vehicle 16.

The symmetry feature value calculation module 7 may detect the centerline of the vehicle 16 using equation (20) used to obtain Rsym (x, y) that is the center of gravity of the vehicle 16. In equation 20, "t" denotes the image 10 that is a currently obtained image.

$$Rsym_{(t,x,y)} = \frac{\sum_{i,j} i * |S_{(t,x-i,y)} - \overline{S}_{(t,x,y)}|}{\sum_{i,j} |S_{(t,x-i,y)} - \overline{S}_{(t,x,y)}|}$$

Equation (20)

Next, processing performed by the vehicle position determination module 8 will be described.

The vehicle position determination module 8 obtains coordinates in the vertical direction 13 and the horizontal direction 14 at which the vehicle 16 exists in the distribution diagram 50 using the result of pattern recognition processing performed by the pattern feature value calculation module 6. The coordinate in the vertical direction 13 is placed at the lower end of the front portion of the vehicle 16 when the vehicle 16 moves toward the front in the image 10. The vehicle position determination module 8 obtains a coordinate in the horizontal direction 14 serving as the center point of the vehicle 16 in the horizontal direction 14 in the distribution diagram 50 using the result of the detection of the centerline of the vehicle 16 which is performed by the symmetry feature value calculation module 7. The vehicle position determination module 8 obtains coordinates serving as a reference position for a region including the vehicle 16 in the image 10 using the results of computation performed by the pattern feature value calculation module 6 and the symmetry feature value calculation module 7. The vehicle position determination module 8 detects a peak luminance level in the image 10 or the distribution diagram 50 using the obtained coordinates so as to obtain the number of pixels corresponding to the width of the front portion of the vehicle 16.

The vehicle position determination module 8 detects the type of the vehicle 16 by searching the database 20 for a record matching the coordinate in the vertical direction 13, which serves as a reference position for a region including the vehicle 16, and the number of pixels corresponding to the width of the front portion of the vehicle 16, which has been obtained by the peak luminance level detection. Consequently, the image processing apparatus 1 can detect the position of the vehicle 16 in the image 10 and specify the type of the vehicle 16.

Figure 12:
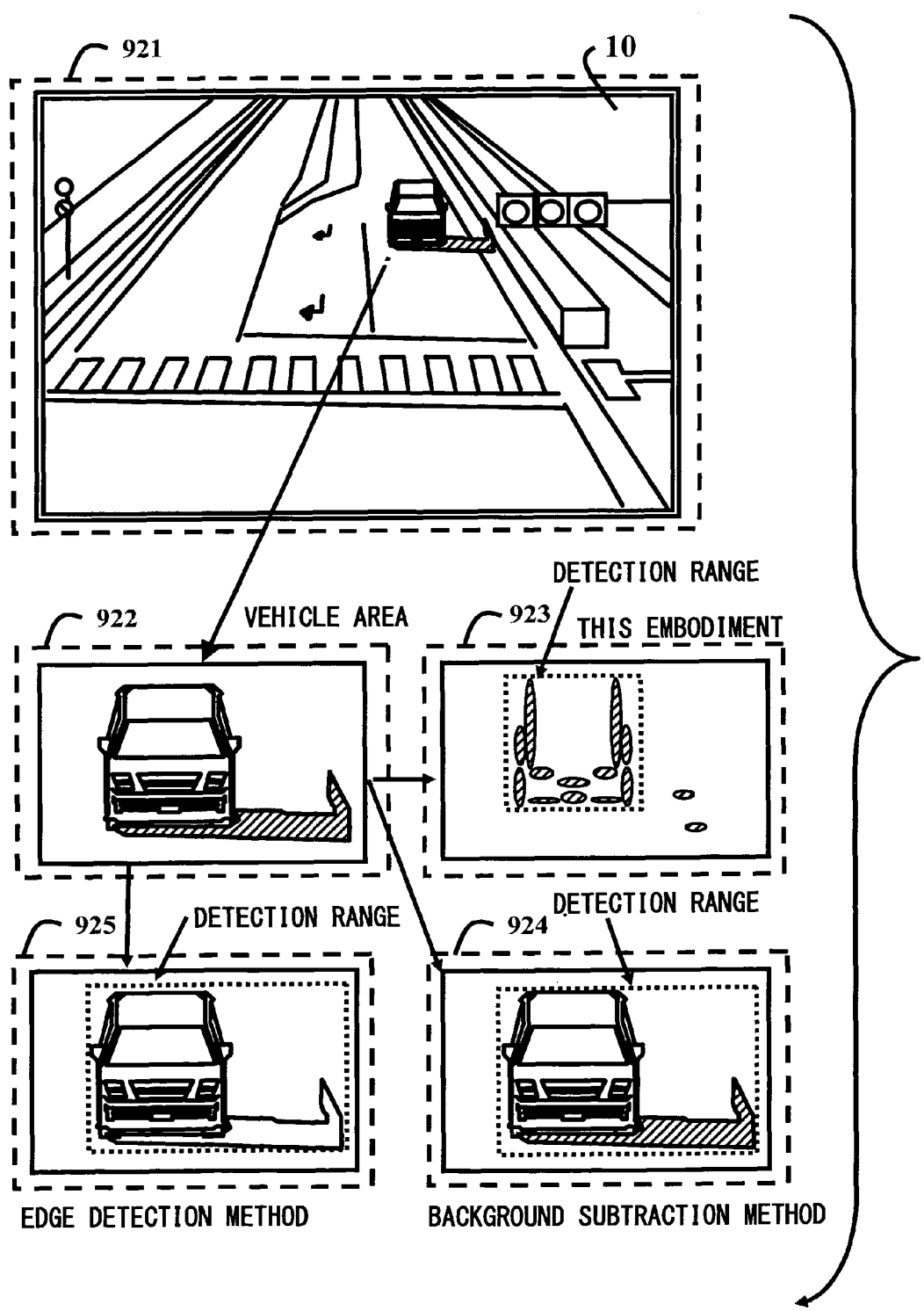
FIG. 12 is a diagram describing the detection of a vehicle according to an embodiment of the invention.

FIG. 12 is diagram describing exemplary vehicle detection according to an embodiment of the invention.

FIG. 12 illustrates an image 921 captured by the camera 2. The image 922 illustrates a region including a vehicle extracted from the image illustrated in the image 921. The image 923 illustrates a detection range according to an embodiment of the invention. The image 924 illustrates a detection range in a background subtraction method in the related art. The image 925 illustrates a detection range in an edge detection method in the related art. In the case of the background subtraction method and the edge detection method, only a vehicle cannot be detected under the influence of shadow.

Figure 13:
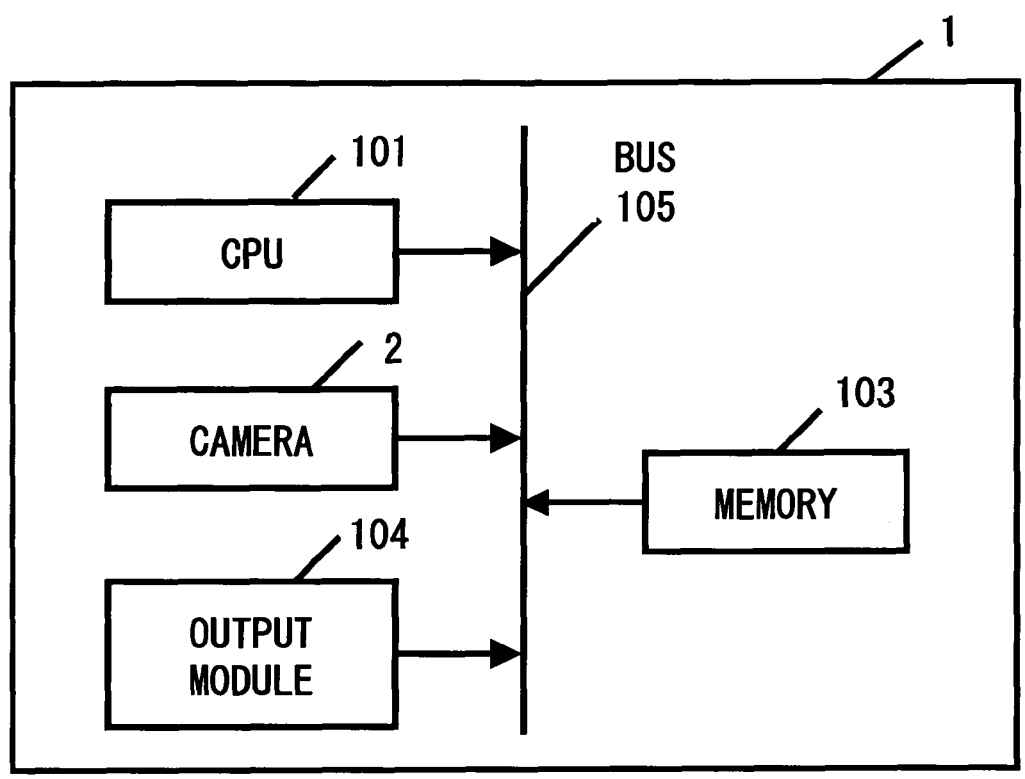
FIG. 13 is a diagram illustrating an exemplary hardware configuration of an image processing apparatus according to an embodiment of the invention.

FIG. 13 is a diagram illustrating an exemplary hardware configuration of the image processing apparatus 1 according to an embodiment of the invention. The image processing apparatus 1 includes a CPU 101, the camera 2, a memory 103, an output module 104, and a bus 105. The CPU 101, the camera 2, the memory 103, and the output module 104 are connected to each other by the bus 105 and exchange data with each other. The CPU 101 is a central processing unit for reading out an image processing program 100 stored in the memory 103 to a work area and executing the image processing program 100. The image processing program 100 causes the CPU 101 included in the image processing apparatus 1 to function as the autocorrelation difference calculation module 4, the road mark deletion module 5, the pattern feature value calculation module 6, the symmetry feature value calculation module 7, and the vehicle position determination module 8.

The memory 103 stores various pieces of information for the image processing apparatus 1. For example, the memory 103 is a RAM or a hard disk device. The memory 103 functions as the work area in which the CPU 101 performs computation, and also stores information stored in the database 20.

The output module 104 is an interface used to output pieces of information about the position of the vehicle 16 in the image 10 and the type of the vehicle 16 to, for example, a wireless terminal device installed in another vehicle. The other vehicle receives information indicating that the vehicle 16 is included in the image 10. In the case of wireless communication, the interface communicates with the wireless terminal device in compliance with a wireless protocol (for example, the IEEE 802.11 protocol).

In this embodiment, the difference 39 among the similarity values 38 of the pixels 11 is used as a basic feature value used to detect vehicle 16. The feature value, which is the difference 39 among the similarity values 38, is large in a curved portion or a corner portion. The symmetry of a front or back portion of the vehicle 16 is used. Accordingly, the feature value is effective if the front or back portion of the vehicle 16 is detected. On the other hand, the feature value is small in a linear portion or a small-curvature portion. Accordingly, the feature value is small in a linear portion such as a shadow portion or a portion of a simple shape. Consequently, the false detection of the vehicle 16 due to shadow or light reflected from a road surface can be prevented using the feature value that is the difference 39 among the similarity values 38.

If an embodiment of the invention is used in a system for periodically obtaining the image 10, the velocity of the vehicle 16 can be calculated by obtaining the difference of a position at which the vehicle 16 exists between the images 10.

In this embodiment, computation is performed using each of the pixels 11. However, the image 10 may be divided into a plurality of blocks including a plurality of pixels (pixels 11) and computation may be performed using each of the blocks. That is, if the size of the image 10 is changed by reducing the number of pixels included therein, a plurality of pixels (the pixels 11) are combined into a single pixel. On the other hand, if the size of the image 10 is changed by increasing the number of pixels included therein, the pixels 11 are additionally interpolated using the neighboring pixels 11. Accordingly, the detection of a vehicle using each block including a plurality of pixels (the pixels 11) is not different from the detection of a vehicle using each of the pixels 11 after the change in size of the image 10.

Furthermore, in this embodiment, the computation region 32, the comparison region 34, and the search range 31, which are set by the autocorrelation difference calculation module 4, are not changed, but may be changed in accordance with a position (for example, the back or front region) in three-dimensional space in the image 10. For example, in the back region in three-dimensional space, the sizes of the search range 31, the computation region 32, and the comparison region 34 are reduced. On the other hand, in the front region in three-dimensional space, the sizes of the search range 31, the computation region 32, and the comparison region 34 are increased. By changing the sizes of the search range 31, the computation region 32, and the comparison region 34, the amount of computation performed by the autocorrelation difference calculation module 4 can be reduced and the detection of a vehicle can be performed at an accuracy that is changed in accordance with a coordinate position. More specifically, data required to change the sizes of the search range 31, the computation region 32, and the comparison region 34 in accordance with the coordinate of the pixel to be computed 33 in the vertical direction 13 in the image 10 is prepared in advance.

In this embodiment, the similarity value is calculated on the basis of a luminance level in the image 10, but may be calculated on the basis of the combination of lightness, hue, and saturation.

According to an embodiment of the invention, the detection of a vehicle position in an image can be performed with a small amount of computation. An embodiment of the invention can be used for a system for informing the state of a vehicle included in an image.

It is an object of the invention to provide an image recognition method, an image processing apparatus, and an image recognition program capable of detecting a subject in an image with a small amount of computation and without being affected by a luminance level.

There is provided an image recognition method according to an embodiment of the invention. The image recognition method is a method of detecting a subject in an image, and includes the steps of: setting a first pixel, a first region including the first pixel as a center pixel, a plurality of second pixels to be compared with the first pixel, and a plurality of second regions each including one of the second pixels as a center pixel; individually associating similarity values obtained by comparing the first region with the second regions with the second pixels; associating the first pixel with one of the similarity values associated with the second pixels which denotes a feature of the first region; and detecting a region having a shape matching a shape defined in advance as a feature of the subject as a portion of the subject in the image. The shape of the region is determined in accordance with the distribution of the similarity values each denoting the feature of the first region.

In three-dimensional space serving as an image capturing region for the image, the image capturing region is set so that, when the subject is in a front portion, a large image of the subject can be obtained, and when the subject is in a back portion, a small image of the subject can be obtained. As a result, the amount of computation can be reduced.

The shape defined as the feature of the subject is a condition required to specify a shape of a vehicle.

Pixels each having a large value of the similarity value are distributed on either side of a detection range. The pattern of the distribution of the pixels each having a large value of the similarity value is symmetric. On a lower side of the detection range, a coordinate at which pixels each having a small value of the similarity value are placed corresponds to a coordinate of the bottom of a front portion of the vehicle.

A center point of the vehicle in a horizontal direction in the image is obtained using the symmetry of the pattern of the distribution of the similarity values, and a position of the vehicle in a vertical direction is specified using the pattern of the distribution of the similarity values and the condition required to specify a shape of the vehicle.

According to an embodiment of the invention, each of pixels included in an image is set as a center pixel of a region, a similarity value is acquired for each of the regions that individually include the pixels, and a region in the image matching a condition determined in advance by the pattern of the distribution of the similarity values is set as an object to be detected. Accordingly, a subject in an image can be detected with a small amount computation and without being affected by a luminance level.

What is claimed is:

1. A method to detect a subject in an image, comprising:
    dividing said image into a plurality of regions;
    calculating a similarity between a feature of one of said regions and a feature of another of said regions;
    determining a distribution of said similarities corresponding to said regions; and
    detecting said subject in said image by determining a correlation of said distribution with a shape of said subject.

2. The method according to claim 1, wherein said calculating associates said similarity which is most similar among features of another of said regions.

3. The method according to claim 1, comprising
    setting a second region to execute said calculating said similarity on a basis of a position of said image.

4. The method according to claim 3, wherein when said image is projected in a three-dimensional space, said calculating sets said second region on said basis of a portion of a depth of said three-dimensional space.

5. The method according to claim 1, wherein said subject is a vehicle, said detecting detects said vehicle of said shape of said distribution of said regions having a large value of said difference being distributed on either side of a detection range, said large value of said difference is symmetric, and a small value of said difference being distributed at a lower side of said detection range.

6. The method according to claim 1, wherein said subject is a vehicle and said calculating further sets said second region capable of extracting said vehicle on said image.

7. The method according to claim 1, wherein said subject is a vehicle, comprising
    determining a position of a center of a width direction of said vehicle on a basis of symmetry of said distribution of said similarities, and
    determining a position of a vertical direction in said image by determining a correlation of said distribution with a shape of said vehicle.

8. The method according to claim 7 comprising
    calculating, when said image is projected in a three-dimensional space, a width of said vehicle on said basis of said width of said subject in said image and said position of said depth of said three-dimensional space.

9. The method according to claim 8 comprising
    determining a type of said vehicle on said basis of said width of said vehicle.

10. The method according to claim 1, wherein said calculating calculates said similarity after deleting a periodically repeated pattern of a crosswalk in said image.

11. An apparatus to detect a subject in an image, comprising:
    a memory to store a shape information of said subject; and
    a processor to execute a process comprising,
        dividing said image into a plurality of regions;
        calculating a similarity between a feature of one of said regions and a feature of another of said regions;
        determining a distribution of said similarities corresponding to said regions; and
        detecting said subject in said image by determining a correlation of said distribution with a shape of said subject.

12. A non-transitory computer readable medium storing a program to detect a subject in an image, according to a process comprising:
    dividing said image into a plurality of regions;
    calculating a similarity between a feature of one of said regions and a feature of another of said regions;

determining a distribution of said similarities corresponding to said regions; and detecting said subject in said image by determining a correlation of said distribution with a shape of said subject.

* * * * *